(12) United States Patent
Kim et al.

(10) Patent No.: US 12,008,197 B2
(45) Date of Patent: Jun. 11, 2024

(54) TOUCH DETECTION MODULE AND DISPLAY DEVICE INCLUDING THE SAME

(71) Applicant: Samsung Display Co., Ltd., Yongin-Si (KR)

(72) Inventors: Hyung Bae Kim, Hwaseong-si (KR); Sang Kook Kim, Cheonan-si (KR); Tae Joon Kim, Seongnam-si (KR); Jae Hyun Park, Hwaseong-si (KR); Ji Yeong Lee, Seoul (KR); Hyun Wook Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/102,069

(22) Filed: Jan. 26, 2023

(65) Prior Publication Data

US 2023/0315228 A1 Oct. 5, 2023

(30) Foreign Application Priority Data

Mar. 31, 2022 (KR) ........................ 10-2022-0040368

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ...... G06F 3/041–048; G06F 2203/041–04114; G06F 3/03547
See application file for complete search history.

(56) References Cited

U.S. PATENT DOCUMENTS

| | | | |
|---|---|---|---|
| 2006/0033011 A1* | 2/2006 | Choi | ..................... G06F 3/0412 |
| | | | 250/208.2 |
| 2023/0305659 A1 | 9/2023 | Kim et al. | |

FOREIGN PATENT DOCUMENTS

| | | | | |
|---|---|---|---|---|
| CN | 107077260 A | * | 8/2017 | ....... G06F 3/041662 |
| KR | 10-2023-0139951 A | | 10/2023 | |

* cited by examiner

*Primary Examiner* — Sanjiv D. Patel
(74) *Attorney, Agent, or Firm* — Innovation Counsel LLP

(57) ABSTRACT

A touch detection module includes driving electrodes extending parallel to each other, sensing electrodes crossing the driving electrodes, and a touch driver circuit for supplying touch driving signals to the driving electrodes and for detecting touch sensing signals through the sensing electrodes to determine touch position coordinates. The touch driver circuit selects between a group driving scheme and a sequential driving scheme for at least one frame. According to the group driving scheme, the touch driver circuit sorts the driving electrodes into groups, simultaneously drives driving electrodes in a same group among the groups, and drives the groups at different times. According to the sequential driving scheme, the touch driving circuit sequentially drives the driving electrodes.

20 Claims, 25 Drawing Sheets

FIG. 6

| DRIVING SCHEME | 1 Frame | 2 Frame | 3 Frame | 4 Frame | ... |
|---|---|---|---|---|---|
| FIRST DRIVING SCHEME (ALTERNATING DRIVING) | SIMULTANEOUS DRIVING CHANNEL NUMBER-k | SEQUENTIALDRIVING_(I) SEQUENTIAL DRIVING CHANNEL NUMBER-l | SIMULTANEOUS DRIVING CHANNEL NUMBER-k | SEQUENTIALDRIVING_(I) SEQUENTIAL DRIVING CHANNEL NUMBER-l | ... |
| SECOND DRIVING SCHEME (SEQUENTIAL INSERTION DRIVING) | SIMULTANEOUS DRIVING CHANNEL NUMBER-k | SIMULTANEOUS DRIVING CHANNEL NUMBER-k | SIMULTANEOUS DRIVING CHANNEL NUMBER-k | SEQUENTIALDRIVING_(I) SEQUENTIAL DRIVING CHANNEL NUMBER-l | ... |
| THIRD DRIVING SCHEME (CHANNEL NUMBER MODULATION DRIVING) | SIMULTANEOUS DRIVING CHANNEL NUMBER-k | SIMULTANEOUS DRIVING CHANNEL NUMBER-l | SIMULTANEOUS DRIVING CHANNEL NUMBER-m | SIMULTANEOUS DRIVING CHANNEL NUMBER-n | ... |

$k > l > M > N \geq 1$

FIG. 12

| DRIVING SCHEME | 1Frame | 2Frame | 3Frame | 4Frame | ... |
|---|---|---|---|---|---|
| FOURTH DRIVING SCHEME (ALTERNATING DRIVING) | NUMBER OF SIMULTANEOUSLY DRIVING CHANNELS=12 Net Value=l | NUMBER OF SIMULTANEOUSLY DRIVING CHANNELS=12 Net Value=m | NUMBER OF SIMULTANEOUSLY DRIVING CHANNELS=12 Net Value=l | NUMBER OF SIMULTANEOUSLY DRIVING CHANNELS=12 Net Value=m | ... |
| FIFTH DRIVING SCHEME (SEQUENTIAL INSERTION DRIVING) | NUMBER OF SIMULTANEOUSLY DRIVING CHANNELS=12 Net Value=l | NUMBER OF SIMULTANEOUSLY DRIVING CHANNELS=12 Net Value=l | NUMBER OF SIMULTANEOUSLY DRIVING CHANNELS=12 Net Value=l | NUMBER OF SIMULTANEOUSLY DRIVING CHANNELS=12 Net Value=m | ... |
| SIXTH DRIVING SCHEME (CHANNEL NUMBER MODULATION DRIVING) | NUMBER OF SIMULTANEOUSLY DRIVING CHANNELS=12 Net Value=j | NUMBER OF SIMULTANEOUSLY DRIVING CHANNELS=12 Net Value=l | NUMBER OF SIMULTANEOUSLY DRIVING CHANNELS=12 Net Value=m | NUMBER OF SIMULTANEOUSLY DRIVING CHANNELS=12 Net Value=n | ... |

$j \geq l > m > n \geq 1$

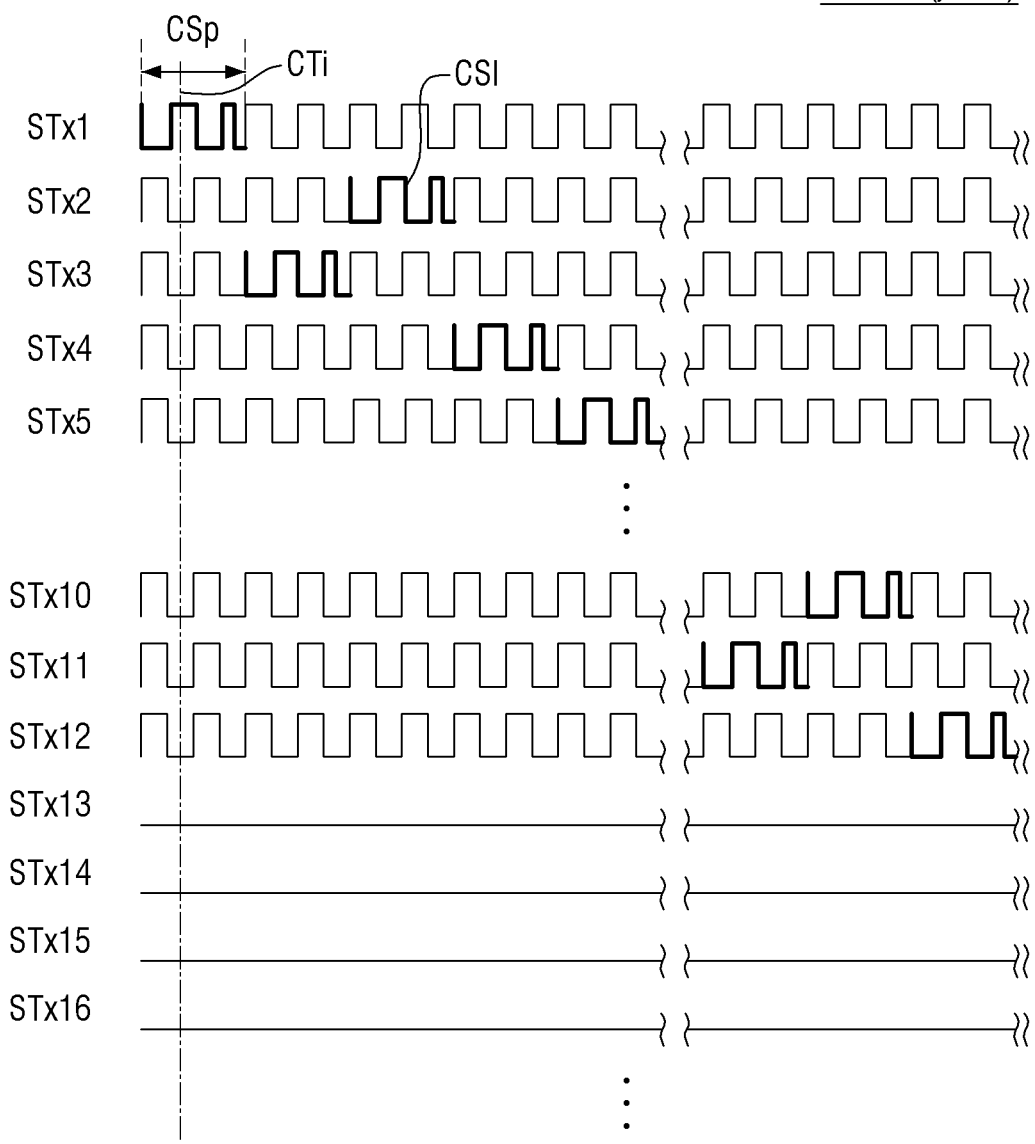

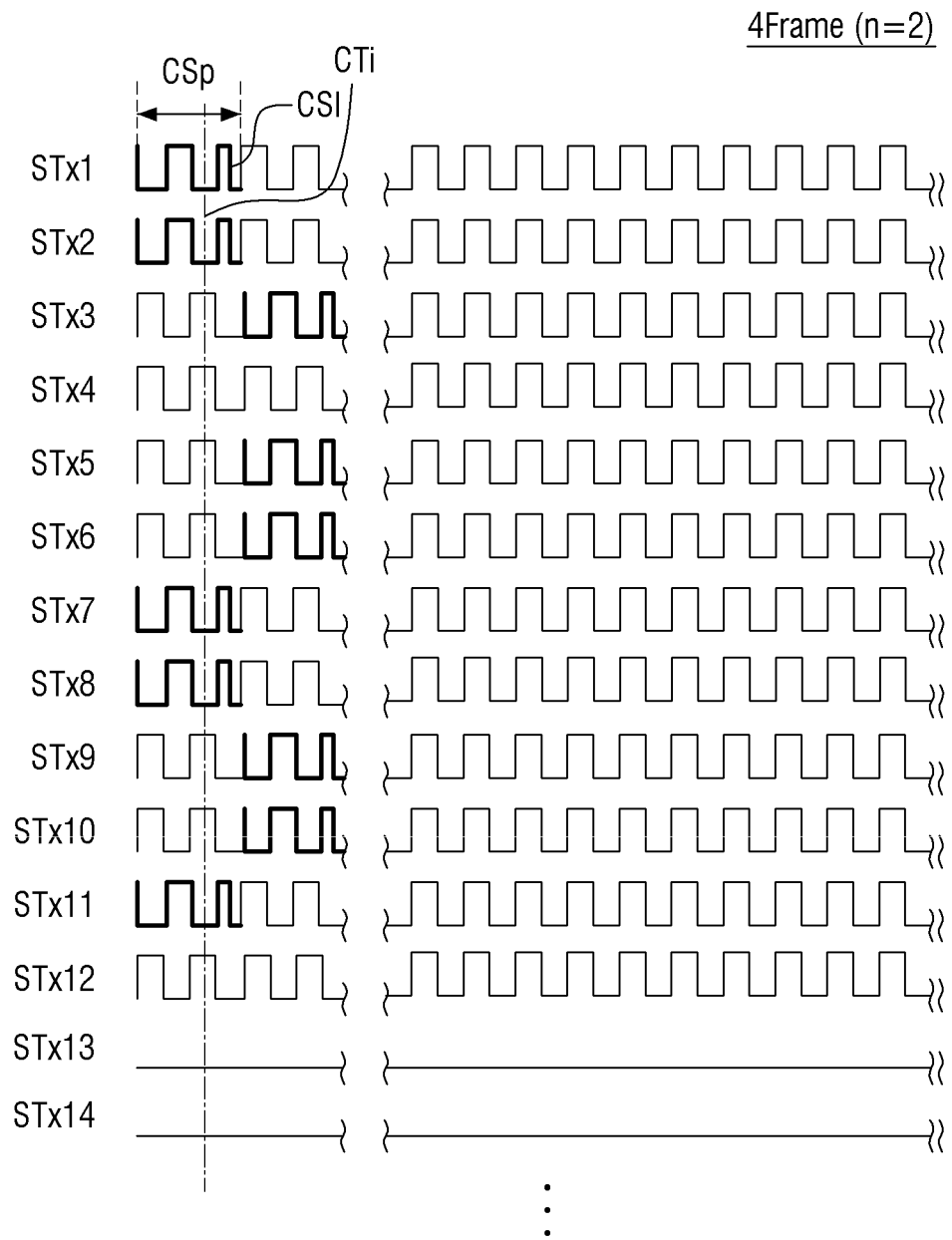

FIG. 17

| DRIVING SCHEME | 1Frame | 2Frame | 3Frame | 4Frame |
|---|---|---|---|---|
| SEVENTH DRIVING SCHEME (ALTERNATING DRIVING) | NUMBER OF SIMULTANEOUSLY DRIVING CHANNELS=k Net Value=l | NUMBER OF SIMULTANEOUSLY DRIVING CHANNELS=k Net Value=m | NUMBER OF SIMULTANEOUSLY DRIVING CHANNELS=k Net Value=l | NUMBER OF SIMULTANEOUSLY DRIVING CHANNELS=12 Net Value=m |
| EIGHTH DRIVING SCHEME (SEQUENTIAL INSERTION DRIVING) | NUMBER OF SIMULTANEOUSLY DRIVING CHANNELS=k Net Value=l | NUMBER OF SIMULTANEOUSLY DRIVING CHANNELS=k Net Value=l | NUMBER OF SIMULTANEOUSLY DRIVING CHANNELS=k Net Value=l | NUMBER OF SIMULTANEOUSLY DRIVING CHANNELS=12 Net Value=m |
| NINTH DRIVING SCHEME (CHANNEL NUMBER MODULATION DRIVING) | NUMBER OF SIMULTANEOUSLY DRIVING CHANNELS=k Net Value=j | NUMBER OF SIMULTANEOUSLY DRIVING CHANNELS=k Net Value=l | NUMBER OF SIMULTANEOUSLY DRIVING CHANNELS=12 Net Value=m | NUMBER OF SIMULTANEOUSLY DRIVING CHANNELS=12 Net Value=n |

$j > l > m > n \geq 1$

TOUCH DETECTION MODULE AND DISPLAY DEVICE INCLUDING THE SAME

This application claims priority to Korean Patent Application No. 10-2022-0040368 filed on Mar. 31, 2022 in the Korean Intellectual Property Office; the Korean Patent Application is incorporated by reference.

BACKGROUND

1. Field

The technical field relates to a touch detection module and a display device including the touch detection module.

2. Description of the Related Art

Display devices may display images in response to input signals. Display devices may be included in various electronic devices, such as smart phones, digital cameras, laptop computers, navigation devices, and smart televisions.

Modern display devices include liquid-crystal display devices, field emission display devices, and light-emitting display devices. A light-emitting display device includes light-emitting elements in a display panel and can display images without requiring a backlight unit that supplies light to the display panel.

A display device may include a touch detection module or may be combined with a touch detection module for sensing a user's touch. A touch detection module may overlap a display panel of a light-emitting display device.

SUMMARY

Embodiment may be related to a touch detection module that can reduce the amount of its electromagnetic interference (EMI) radiation. Embodiments may be related to a display device including the touch detection module.

Embodiments may be related to a touch detection module that can selectively adjust the number of simultaneously driven touch driving electrodes and the sum of phases of the simultaneously driven touch driving electrodes. Embodiments may be related to a display device including the touch detection module.

According to an embodiment, a touch detection module comprising driving electrodes arranged in parallel, sensing electrodes crossing the driving electrodes, and a touch driver circuit configured to supply touch driving signals to the driving electrodes and detect touch sensing signals through the sensing electrodes to identify touch position coordinates, wherein the touch driver circuit selects at least every frame between a simultaneous driving scheme that sorts the driving electrodes into groups to simultaneously drive the driving electrodes in each of the groups and a sequential driving scheme that sequentially drives the driving electrodes, and supplies the touch driving signals according to the selected schemes.

The touch driver circuit combines the simultaneous driving scheme and the sequential driving scheme over different frames or alternates them at least every frame, and supplies the touch driving signals in the selected schemes at least every frame.

The touch driver circuit, in the simultaneous driving scheme, changes a number of touch electrodes in each group that are simultaneously driven at least every frame and simultaneously supplies the touch driving signals to the changed number of touch electrodes at least every frame.

The touch driver circuit supplies code signals to at least one driving electrode sequentially or simultaneously during a period in which the touch driving signals are supplied simultaneously to the touch electrodes in each group, and detects the code signals through the sensing electrodes.

The touch driver circuit comprises a driving signal output for supplying the touch driving signals to the driving electrodes, a sensing circuit for detecting the touch sensing signals through the sensing electrodes, a touch driving controller for controlling driving of the driving signal output so that the touch driving signals are supplied to the driving electrodes, and a driving mode setter for selecting between the simultaneous driving scheme and the sequential driving scheme at least every frame, and supplying a driving setting signal corresponding to the selected driving scheme to the touch driving controller.

The driving mode setter sets a number of driving electrodes in each group that are simultaneously driven among the driving electrodes, and supplies a first driving setting signal to the touch driving controller so that the touch driving signals are simultaneously supplied to the driving electrodes in each group at least every frame.

The driving mode setter generates a second driving setting signal so that the touch driving signals are sequentially supplied to the driving electrodes during the at least one frame period and supplies the second driving setting signal to the touch driving controller in a frame period different from the frame period in which the first driving setting signal is supplied.

The driving mode setter, in the simultaneous driving scheme, changes a number of touch electrodes in each group at least every frame so that the number of touch electrodes in each group that are simultaneously driven is changed at least every frame, and changes a number of codes of the first driving setting signal at least every frame according to the changed number of the driving electrode that are simultaneously driven to supply it to the touch driving controller.

The driving mode setter generates a third driving setting signal to supply the third driving setting signal to the touch driving controller so that predetermined code signals are sequentially or simultaneously supplied to at least one driving electrode among the touch electrodes in each group that are simultaneously driven.

The driving mode setter changes a number and an order of the code signals at least every frame so that a number and an order of driving electrodes to which the code signals are simultaneously supplied among the touch electrodes in each group that are simultaneously driven are changed at least every frame, and changes a sum and an order of the third driving setting signal according to the number and the order of the code signals that are changed at least every frame to supply it to the touch driving controller.

The driving mode setter combines or alternates the first and third driving setting signals at least every frame to supply them to the touch driving controller so that the number of the touch electrodes in each group that are simultaneously driven, and the sum of phases and the order of the driving electrodes in each group are changed at least every frame.

The driving mode setter changes the sum of phases of the third driving setting signal to supply it to the touch driving controller so that a sum of phases of the touch electrodes in each group that are simultaneously driven or the sum of phases are repeatedly and sequentially changed to predetermined different values.

The driving mode setter changes the number of codes of the first driving setting signal and the sum of phases of the third driving setting signal at least every frame and supplies them to the touch driving controller.

According to an embodiment, a display device comprising a display panel comprising a display area in which sub-pixels is arranged, and a touch detection module disposed on a front surface of the display panel to detect a user's touch, wherein the touch detection module comprises driving electrodes arranged in parallel, sensing electrodes crossing the driving electrodes, and a touch driver circuit configured to supply touch driving signals to the driving electrodes and detect touch sensing signals through the sensing electrodes to identify touch position coordinates, wherein the touch driver circuit selects at least every frame between a simultaneous driving scheme that sorts the driving electrodes into groups to simultaneously drive the driving electrodes in each of the groups and a sequential driving scheme that sequentially drives the driving electrodes, and supplies the touch driving signals according to the selected schemes.

The touch driver circuit comprises a driving signal output for supplying the touch driving signals to the driving electrodes, a sensing circuit for detecting the touch sensing signals through the sensing electrodes, a touch driving controller for controlling driving of the driving signal output so that the touch driving signals are supplied to the driving electrodes, and a driving mode setter for selecting between the simultaneous driving scheme and the sequential driving scheme at least every frame, and supplying a driving setting signal corresponding to the selected driving scheme to the touch driving controller.

The driving mode setter sets a number of driving electrodes in each group that are simultaneously driven among the driving electrodes, and supplies a first driving setting signal to the touch driving controller so that the touch driving signals are simultaneously supplied to the driving electrodes in each group at least every frame.

The driving mode setter, in the simultaneous driving scheme, changes a number of touch electrodes in each group at least every frame so that the number of touch electrodes in each group that are simultaneously driven is changed at least every frame, and changes a number of codes of the first driving setting signal at least every frame according to the changed number of the driving electrode that are simultaneously driven to supply it to the touch driving controller.

The driving mode setter generates a third driving setting signal to supply the third driving setting signal to the touch driving controller so that predetermined code signals are sequentially or simultaneously supplied to at least one driving electrode among the touch electrodes for each group that are simultaneously driven.

The driving mode setter changes a number and an order of the code signals at least every frame so that a number and an order of driving electrodes to which the code signals are simultaneously supplied among the touch electrodes in each group that are simultaneously driven are changed at least every frame, and changes a sum and an order of the third driving setting signal according to the number and the order of the code signals that are changed at least every frame to supply it to the touch driving controller.

The driving mode setter changes a number and an order of the code signals at least every frame so that a number and an order of driving electrodes to which the code signals are simultaneously supplied among the touch electrodes in each group that are simultaneously driven are changed at least every frame, and changes a sum and an order of the third driving setting signal according to the number and the order of the code signals that are changed at least every frame to supply it to the touch driving controller.

An embodiment may be related to a touch detection module. The touch detection module may include driving electrodes extending parallel to each other, sensing electrodes crossing the driving electrodes, and a touch driver circuit for supplying touch driving signals to the driving electrodes and for detecting touch sensing signals through the sensing electrodes to determine touch position coordinates. The touch driver circuit may select between a group driving scheme and a sequential driving scheme for at least one frame among consecutive frames. According to the group driving scheme, the touch driver circuit may sort the driving electrodes into groups, may simultaneously drive driving electrodes in a same group among the groups, and may drive the groups at different times. According to the sequential driving scheme, the touch driving circuit may sequentially drive the driving electrodes.

The touch driver circuit may select the group driving scheme for some frames among four consecutive frames and may select the sequential driving scheme for one or more other frames among the four consecutive frames.

The touch driver circuit may select the group driving scheme and may set a first number of driving electrodes in each group for a first frame. The touch driver circuit may select the group driving scheme and may set a second number of driving electrodes in each group for a second frame. The first number may be unequal to the second number.

The touch driver circuit may supply code signals to at least one driving electrode in a first group sequentially or simultaneously when the touch driver circuit supplies first touch driving signals simultaneously to driving electrodes in the first group. The touch driver circuit may detect the code signals through the sensing electrodes.

The touch driver circuit may include the following elements: a driving signal output for supplying the touch driving signals to the driving electrodes; a sensing circuit for detecting the touch sensing signals through the sensing electrodes; a touch driving controller for controlling the driving signal output so that the touch driving signals are supplied to the driving electrodes; and a driving mode setter for selecting one of the group driving scheme and the sequential driving scheme as a selected driving scheme and for supplying one or more driving setting signals corresponding to the selected driving scheme to the touch driving controller.

The driving mode setter may set a number of driving electrodes to be simultaneously driven in each group to generate a first driving setting signal, and may supply the first driving setting signal to the touch driving controller so that the driving signal output may supply first touch driving signals simultaneously to driving electrodes in a first group for a first frame.

The driving mode setter may supply a second driving setting signal to the touch driving controller so that the driving signal output may supply second touch driving signals sequentially to the driving electrodes for a second frame different from the first frame.

The driving mode setter, in the group driving scheme, may set two different numbers of driving electrodes in each group for two consecutive frames, respectively, and may set two different numbers of codes according to the two different numbers of the driving electrodes in each group for the two consecutive frames, respectively.

The driving mode setter may generate a third driving setting signal and may supply the third driving setting signal to the touch driving controller so that the driving signal output may supply predetermined code signals sequentially or simultaneously to at least one driving electrode among the driving electrodes in the first group.

The driving mode setter may set two different numbers and two different orders of code signals for two third driving setting signals for two different frames, respectively.

The driving mode setter may supply the third driving setting signal the touch driving controller for at least one of the first frame, the second frame, and a third frame different from each of the first frame and the second frame.

The driving mode setter may set two different sums of phases for the two third driving setting signals or two other third driving setting signals for the two different frames or two other different frames.

The driving mode setter may set two different numbers of codes for two first driving setting signals and may set two different sums of phases for the two third driving setting signals or two other third driving setting signals for the two different frames or two other different frames.

An embodiment may be related to a display device. The display device may include a display panel and a touch detection module. The display panel may include a display area that includes sub-pixels. The touch detection module may overlap the display panel and may include one or more of the above-described features.

According to an embodiment, it is possible to shorten the time taken to sense a touch by simultaneously supplying touch driving signals to touch driving electrodes in a touch detection module of a display device, and to increase the accuracy of sensing a touch.

According to embodiments, a touch detection module may selectively adjust the number of simultaneously driven touch driving electrodes and/or the sum of phases of the simultaneously driven touch driving electrodes. Advantageously, the amount of EMI radiation generated by the touch detection module may be desirably reduced.

BRIEF DESCRIPTION OF THE DRAWINGS

FIG. 6 is a diagram showing different touch driving schemes of a touch driver circuit according to a first embodiment.

FIG. 12 is a view showing different touch driving schemes of a touch driver circuit according to a second embodiment.

FIG. 15 is a timing diagram illustrating code signals and touch driving signals supplied to touch driving electrodes in one of the frame periods shown in FIG. 13 according to an embodiment.

FIG. 16 is a timing diagram illustrating code signals and touch driving signals supplied to touch driving electrodes in one of the frame periods shown in FIG. 13 according to an embodiment.

FIG. 17 is a view showing different touch driving schemes of a touch driver circuit according to a third embodiment.

DETAILED DESCRIPTION OF EMBODIMENTS

Examples of embodiments are described with reference to the accompanying drawings. Practical embodiments may be embodied in different forms and should not be construed as limited to the described embodiments.

The same reference numbers may indicate the same components or similar components.

Although the terms "first," "second," etc. may be used to describe various elements, these elements should not be limited by these terms. These terms are used to distinguish one element from another element. A first element could be termed a second element without departing from the teachings of the present disclosure. A second element could be termed a first element. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

At least some of the features of the described embodiments may be combined in part or in whole. Technically, various interlocking and driving schemes are possible. The described embodiments may be implemented independently of each other or may be implemented in combinations.

The term "on" may mean "directly on" or "indirectly on." The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The term "include" may mean "be made of." The term "adjacent" may mean "immediately adjacent." The term "pattern" may mean "member." The expression that an element extends in a particular direction may mean that the element extends lengthwise in the particular direction and/or that the lengthwise direction of the element is in the particular direction. The term "compensate" may mean "adjust." The term "compensation" may mean "adjustment." The term "group-wise" may mean "group-based." The term "simultaneous driving channels" may mean "simultaneously driven channels." The term "number of driving electrodes TE in each group" may mean "number of" columns/sets of driving electrodes TE in each group. The term "k driving electrodes TE" may mean "k columns/sets of driving electrodes TE", wherein k is an integer. The term "simultaneous driving scheme" may mean "group driving scheme." The term "number" may mean "quantity."

Figure 1:
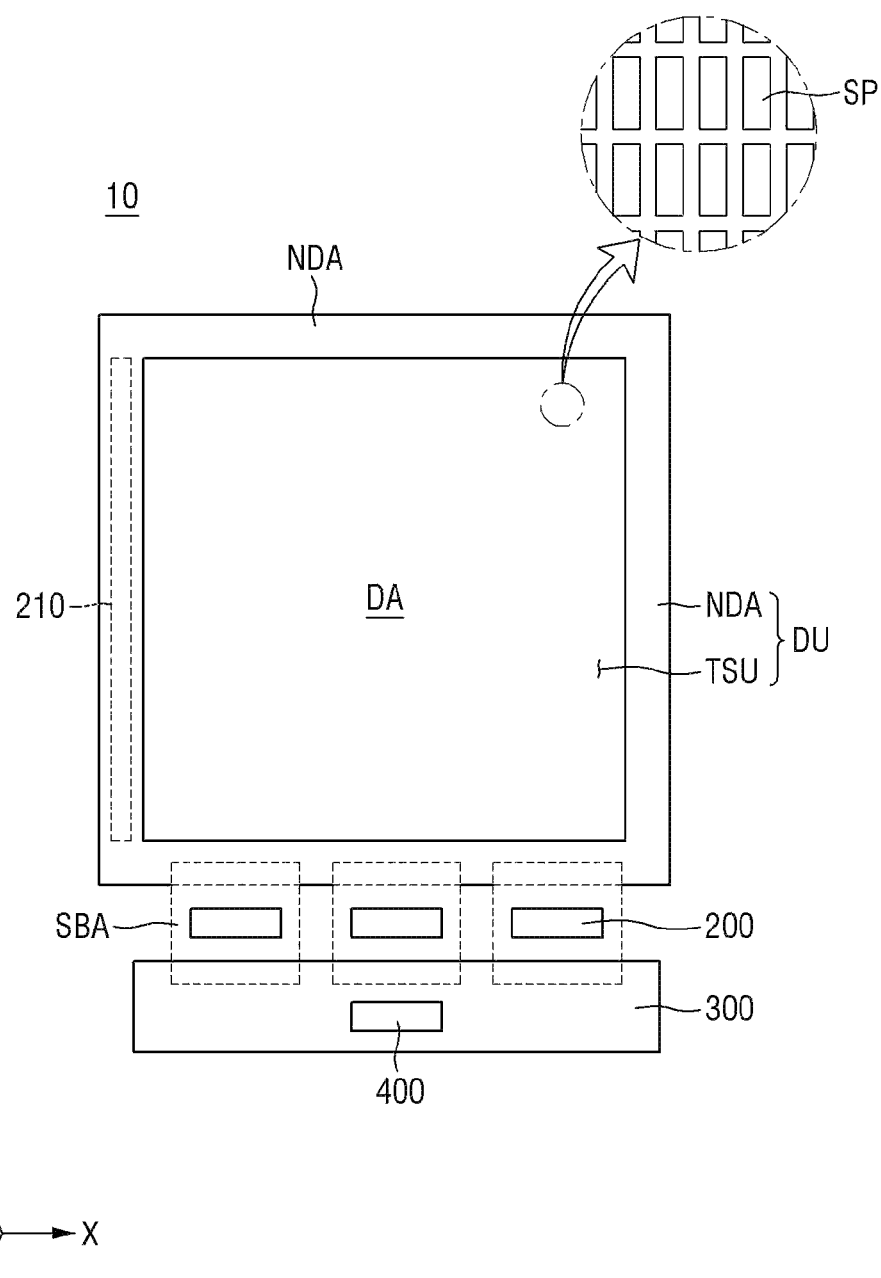
FIG. 1 is a plan view showing a display device according to an embodiment.
Figure 2:
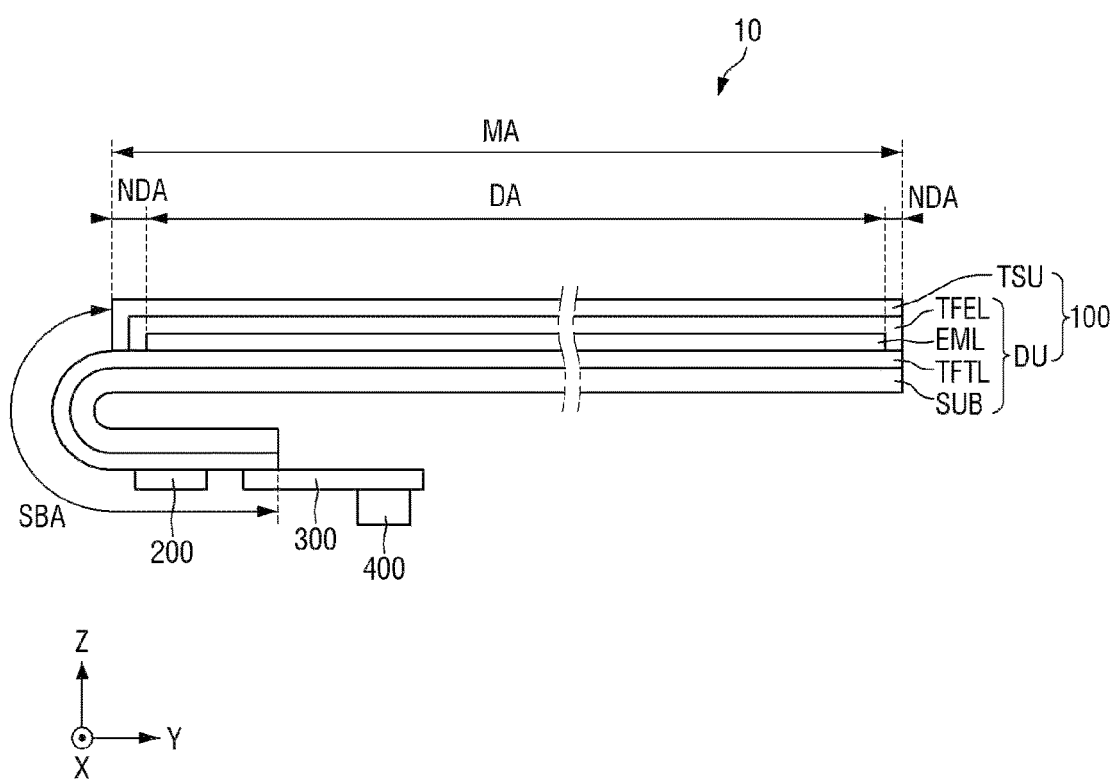
FIG. 2 is a cross-sectional view showing a side of the display device of FIG. 1 according to an embodiment.

FIG. 1 is a plan view showing a display device 10 according to an embodiment. FIG. 2 is a cross-sectional view showing a side of the display device 10 of FIG. 1 according to an embodiment.

The display device 10 may be included in an electronic device, such as a mobile phone, a smart phone, a tablet PC, a mobile communications terminal, an electronic notebook, an electronic book, a portable multimedia player (PMP), a navigation device, an ultra-mobile PC (UMPC), a television, a laptop computer, a monitor, an electronic billboard, or an device of the Internet of Things (IOT), a smart watch, a watch phone, a glasses-type display, or a head-mounted display (HMD) device.

The display device 10 may be/include at least one of an organic light-emitting display device (OLED), an inorganic light-emitting display device (inorganic LED), a quantum-dot light-emitting display device (QED), a micro-LED display device (micro-LED), a nano-LED display device (nano-LED), a plasma display device (PDP), a field emission display device (FED), a liquid-crystal display device (LCD), an electrophoretic display device (EPD), etc.

The display device 10 may have a rectangular shape, a square shape, a circular shape, an elliptical shape, and/or a quadrangular shape in a plan view of the display device 10.

The display device 10 includes a display panel 100, a display driver circuit 200, and a touch driver circuit 400.

The display panel 100 of the display device 10 may include a display unit DU displaying images, and may include a touch sensing unit TSU disposed on the display unit DU to sense a part of a human body and/or an electronic pen. The display unit DU of the display panel 100 may include sub-pixels SP and may display images using the sub-pixels SP. The touch sensing unit TSU may include touch electrodes for performing capacitive sensing.

The display driver circuit 200 may output signals and voltages for driving the sub-pixel SP in the display unit DU. The display driver circuit 200 may supply data voltages to data lines connected to the sub-pixels SP. The display driver circuit 200 may apply a supply voltage to a voltage line and may supply gate control signals to a gate driver 210.

The touch driver circuit 400 may be electrically connected to the touch sensing unit TSU. The touch driver circuit 400 may supply touch driving signals to touch electrodes arranged in the touch sensing unit TSU and may sense a change in the capacitance associated with the touch electrodes. The touch driver circuit 400 may determine whether a user's touch occurs and may find the coordinates of the touch based on the amount of the change in the capacitance.

The display driver circuit 200 may be a main processor or may be part of a main processor. The display driver circuit 200 may control overall functions of the display device 10. The display driver circuit 200 may receive touch data from the touch driver circuit 400 to determine the user's touch coordinates, and then may generate digital video data based on the touch coordinates. The display driver circuit 200 may run an application indicated by an icon displayed on the user's touch coordinates. The display driver circuit 200 may receive coordinate data from an electronic pen to determine the touch coordinates of the electronic pen, and then may generate digital video data according to the touch coordinates or may run an application indicated by an icon displayed at the touch coordinates of the electronic pen.

Referring to FIG. 2, the display panel 100 may include a main area MA and a subsidiary area SBA. The main area MA may include a display area DA where the sub-pixels SP for displaying images are disposed, and may include a non-display area NDA located around the display area DA. In the display area DA, light may be emitted from emission areas of sub-pixels SP to display an image. Each of the sub-pixels SP in the display device DA may include a pixel circuit including switching elements, a pixel-defining layer that defines the emission area, and a light-emitting element.

The non-display area NDA may abut the display area DA. The non-display area NDA may be an edge area of the main area MA of the display panel 100. The non-display area NDA may include the gate driver 210 that applies gate signals to gate lines, and fan-out lines (not shown) that connect the display driver circuit 200 with the display area DA.

The subsidiary area SBA may be extended from one side of the main area MA. The subsidiary area SUB may include a flexible material that can be bent, folded, and/or rolled. When the subsidiary area SBA is bent, the subsidiary area SBA may overlap the main area MA in the thickness direction (z-axis direction). The subsidiary area SBA may include pads connected to the display driver circuit 200 and the circuit board 300. The subsidiary area SBA may be optional, and the display driver circuit 200 and the pads may be disposed in the non-display area NDA.

At least one display driver circuit 200 may be implemented as an integrated circuit (IC) and may be attached on the display panel 100 by a chip-on-glass (COG) technique, a chip-on-plastic (COP) technique, or ultrasonic bonding. The display driver circuit 200 may be disposed in the subsidiary area SBA and may overlap with the main area MA in the thickness direction (z-axis direction) as the subsidiary area SBA is bent. The display driver circuit 200 may be mounted on the circuit board 300.

The circuit board 300 may be attached on the pads of the display panel 100 using an anisotropic conductive film (ACF). Lead lines of the circuit board 300 may be electrically connected to the pads of the display panel 300. The circuit board 300 may be a flexible printed circuit board (FPCB), a printed circuit board (PCB), or a flexible film such as a chip-on-film (COF).

The touch driver circuit 400 may be mounted on a separate circuit board. The touch driver circuit 400 may be implemented as an integrated circuit (IC). The touch driver circuit 400 applies the touch driving signals to the touch electrodes of the touch sensing unit TSU, and measures the amount of a change of charges in mutual capacitance of touch nodes formed by the touch electrodes. The touch driver circuit 400 measures a change in capacitance of the touch nodes according to a change the amount of voltage or current of a touch sensing signal received through the touch electrodes. In this manner, the touch driver circuit 400 may determine whether there is a user's touch or proximity, based on the amount of a change in the mutual capacitance of touch nodes. The touch driving signal may be a pulse signal having a predetermined frequency. The touch driver circuit 400 may determine whether there is touch by a part of a user's body such as a finger and may find the coordinates of the touch, if any, based on the amount of the change in the capacitance associated with touch electrodes.

The touch driver circuit 400 may sequentially supply touch driving signals to the touch electrodes arranged in parallel in the touch sensing unit TSU, and may sequentially measure the amount of a change in the capacitance of the touch nodes formed by the touch electrodes to detect whether there is a user's touch.

The touch driver circuit 400 may detect the position of the user's touch by driving the touch electrodes of the touch sensing unit TSU by code division multiplexing (CDM). The touch driver circuit 400 sorts all the touch electrodes of the touch sensing unit TSU into groups. By simultaneously supplying touch driving signals to touch electrodes in each group, it is possible to measure the amount of a change in the capacitance through the touch electrodes in each group to detect a user's touch position. In order to simultaneously supply touch driving signals to the touch electrodes in each group and detect a change in the capacitance, it is required to distinguish between and identify the positions of the simultaneously driven touch electrodes. To this end, the touch driver circuit 400 supplies code signal(s) to at least one touch electrode during a period in which the touch driving signals are simultaneously supplied to the touch electrodes in each group. The code signals may be sequentially supplied to the touch electrodes in each group, or the code signals may be simultaneously supplied to the touch electrodes. The code signal(s) supplied to at least one touch electrode may be a signal in anti-phase with the touch driving electrodes or a negative signal. The touch driver circuit 400 can detect a change in capacitance of a connection node for each touch electrode while identifying the position of each of the touch electrodes according to a code signal obtained from each touch electrode.

If touch positions are sequentially sensed by sequentially supplying touch driving signals to all of the touch electrodes of the touch sensing unit TSU, the amount of electromagnetic interference (EMI) radiation produced by the touch sensing unit TSU can be reduced. However, it may take longer to detect a touch as all of the touch electrodes are sequentially driven, and the accuracy of touch detection may be lowered. In contrast, by setting the number of touch electrodes in each group that are simultaneously driven among all of the touch electrodes and by simultaneously supplying touch driving signals to the touch electrodes in each group to detect a touch position, it is possible to shorten the time taken to detect a touch. The number of times of touch detection can be increased, so that the accuracy of the touch detection can be improved. However, since touch electrodes is simultaneously driven in each group, the amount of EMI radiation according to the touch driving signals may be increased.

According to embodiments, the touch driver circuit 400 can adjust the amount of EMI radiation by combining or alternating a scheme in which touch electrodes are driven simultaneously group by group (hereinafter referred to as "group-wise driving scheme") and a scheme in which all of the touch electrodes are driven sequentially (hereinafter referred to as "sequential driving scheme") at least every frame. The touch driver circuit 400 can adjust the amount of EMI radiation and the accuracy of touch detection by changing or adjusting the number of touch electrodes in each group that are simultaneously driven (e.g., the number of touch driving channels) at least every frame when the group-wise driving scheme is applied for the touch electrodes. The touch driver circuit 400 can adjust the amount of EMI radiation by controlling code signals so that the code signals are supplied sequentially or simultaneously to touch electrodes in a period in which the touch driving signals are supplied simultaneously to the groups under the group-wise driving scheme. Herein, the code signals sequentially or simultaneously supplied to at least one touch electrode may be supplied during a period in which the touch driving signals are supplied. In addition, since the code signals may be in anti-phase with the touch driving signals or may be negative signals, the amount of EMI radiation can be reduced due to electromagnetic cancellation between the code signals and the touch driving signals. In this manner, the touch driver circuit 400 can selectively reduce the amount of EMI radiation by selectively adjusting the number of touch electrodes in each group that are simultaneously driven and the sum of phases of the touch electrodes in each group. The sum of the phases of the touch electrodes in each group may be the sum of the positive phases of the remaining touch driving signals after the phase cancellation due to the code signals.

The substrate SUB of the display panel 100 shown in FIG. 2 may be a base substrate or a base member. The substrate SUB may be a flexible substrate that can be bent, folded, and/or rolled. The substrate SUB may include a glass material or a metal material. The substrate SUB may include a polymer resin such as polyimide PI.

The thin-film transistor layer TFTL may be disposed on the substrate SUB. The thin-film transistor layer TFTL may include thin-film transistors forming pixel circuits of the sub-pixels SP. The thin-film transistor layer TFTL may include gate lines, data lines, voltage lines, gate control lines, fan-out lines for connecting the display driver circuit 200 with the data lines, lead lines for connecting the display driver circuit 200 with the pads, etc. When the gate driver 210 is formed on one side of the non-display area NDA of the display panel 100, the gate driver 210 may include thin-film transistors.

The thin-film transistor layer TFTL may be disposed in the display area DA, the non-display area NDA and the subsidiary area SBA. The thin-film transistors in the pixels, the gate lines, the data lines, and the voltage lines in the thin-film transistor layer TFTL may be disposed in the display area DA. The gate control lines and the fan-out lines in the thin-film transistor layer TFTL may be disposed in the non-display area NDA. The lead lines of the thin-film transistor layer TFTL may be disposed in the subsidiary area SBA.

The emission material layer EML may be disposed on the thin-film transistor layer TFTL. The emission material layer EML may include light-emitting elements each including a first electrode, an emissive layer, and (a portion of) a second electrode that are stacked, and may include a pixel-defining layer for defining the pixels. The light-emitting elements in the emission material layer EML may be disposed in the display area DA.

The encapsulation layer TFEL may cover the upper and side surfaces of the emission material layer EML, and can protect the emission material layer EML. The encapsulation layer TFEL may include at least one inorganic layer and at least one organic layer for encapsulating the emission material layer EML.

The touch sensing unit TSU may be disposed on the encapsulation layer TFEL. The touch sensing unit TSU may include touch electrodes for sensing a user's touch by capacitive sensing, and may include touch lines connecting the touch electrodes to the touch driver circuit 400. The touch sensor unit TSU may sense a user's touch by self-capacitance sensing or mutual capacitance sensing.

The touch sensing unit TSU may be disposed on a separate substrate disposed on the display unit DU. The substrate supporting the touch sensing unit TSU may be a base member encapsulating the display unit DU.

The touch electrodes included the touch sensing unit TSU may be disposed in a touch sensor area overlapping the display area DA. The touch lines of the touch sensing unit TSU may be disposed in a touch peripheral area overlapping the non-display area NDA.

Figure 3:
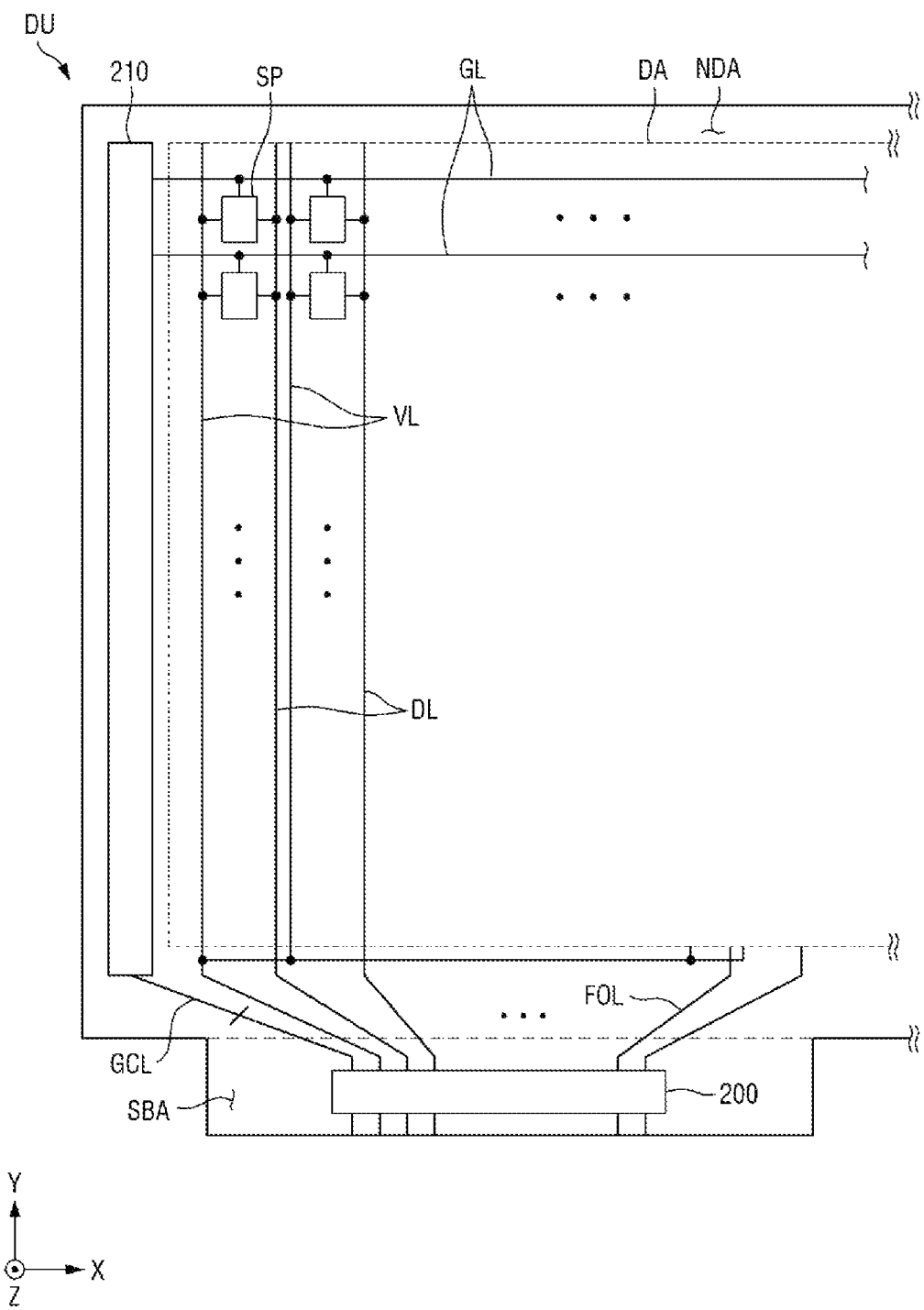
FIG. 3 is a view showing a layout of a display panel according to an embodiment.

FIG. 3 is a view showing a layout of a display panel according to an embodiment. FIG. 3 shows the display area DA and the non-display area NDA of the display unit DU.

The display area DA may be located at a central area of the display panel 100. The display area DA may include sub-pixels SP, gate lines GL, data lines DL and voltage lines VL. Each of the sub-pixels SP may be a minimum unit that outputs light.

The gate lines GL may supply the gate signals received from the gate driver 210 to the sub-pixels SP. The gate lines GL may extend in the x-axis direction and may be spaced from one another in the y-axis direction different from (and perpendicular to) the x-axis direction.

The data lines DL may supply the data voltages received from the display driver circuit 200 to the sub-pixels SP. The data lines DL may extend in the y-axis direction and may be spaced from one another in the x-axis direction.

The voltage lines VL may supply the supply voltage received from the display driver circuit 200 to the pixels SP. The supply voltage may include at least one of a driving voltage, an initialization voltage, and a reference voltage. The voltage lines VL may extend in the y-axis direction and may be spaced from one another in the x-axis direction.

The non-display area NDA may surround the display area DA. The non-display area NDA may include the gate driver 210, fan-out lines FOL, and gate control lines GCL. The gate driver 210 may generate gate signals based on the gate control signal, and may sequentially supply the gate signals to the gate lines GL in a predetermined order.

The fan-out lines FOL may extend from the display driver circuit 200 to the display area DA. The fan-out lines FOL may supply the data voltage received from the display driver circuit 200 to the data lines DL.

The gate control line GCL may extend from the display driver circuit 200 to the gate driver 210. The gate control line GCL may supply the gate control signal received from the display driver circuit 200 to the gate driver 210.

The display driver circuit 200 may output signals and voltages for driving the display panel 100 to the fan-out lines FOL. The display driver circuit 200 may supply data voltages to the data lines DL through the fan-out lines FOL. The data voltages may be applied to the sub-pixels SP, so that the luminance of the sub-pixels SP may be determined. The display driver circuit 200 may supply a gate control signal to the gate driver 210 through the gate control line GCL.

Figure 4:
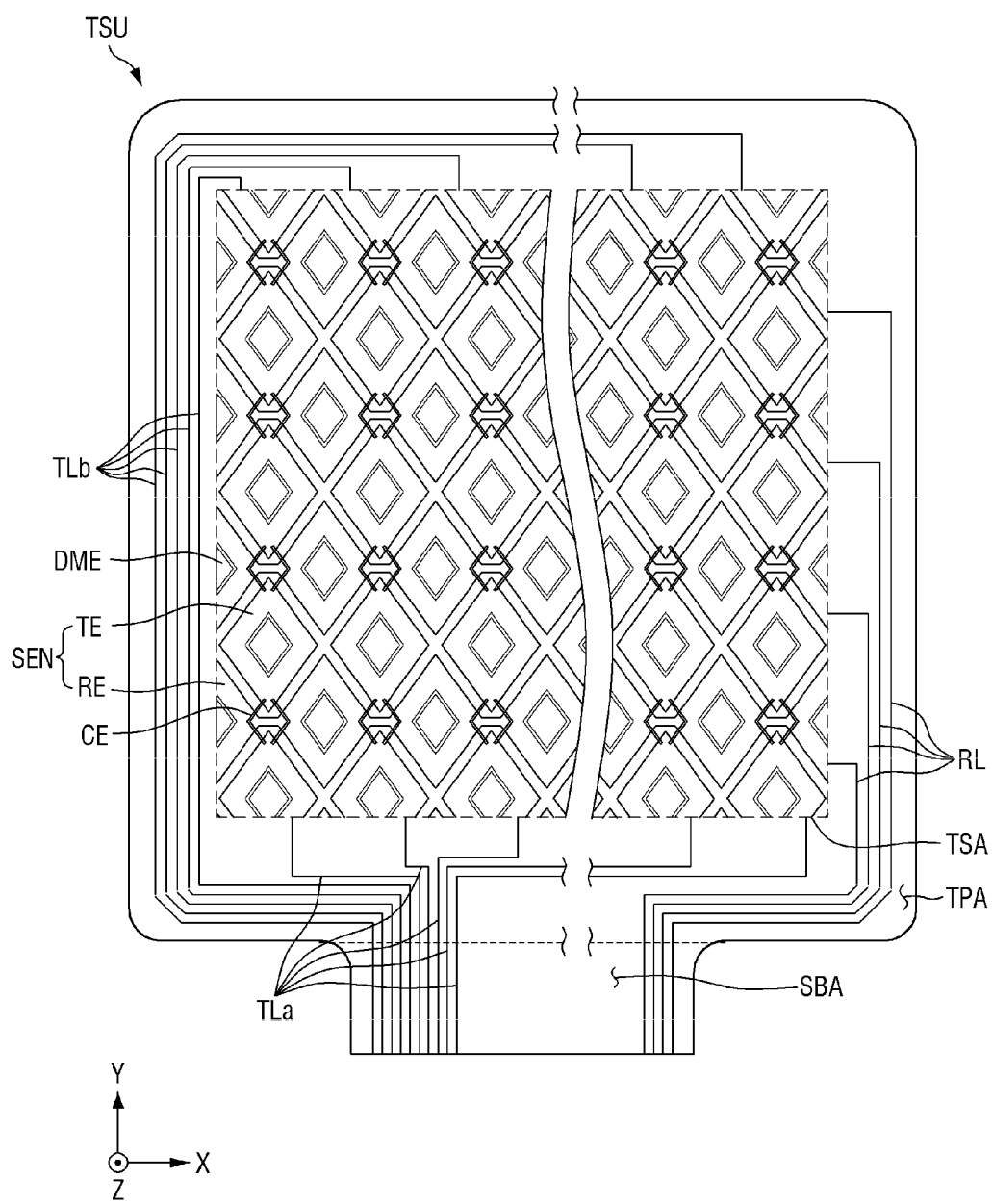
FIG. 4 is a view showing a layout of a touch detection module according to an embodiment.

FIG. 4 is a view showing a layout of a touch detection module according to an embodiment.

Referring to FIG. 4, the touch electrodes SEN of the main area MA include two kinds of electrodes, e.g., the driving electrodes TE and the sensing electrodes RE. The mutual capacitive sensing is carried out by applying touch driving signals to the driving electrode TE, and then sensing the amount of change in the mutual capacitance of the touch nodes through the sensing electrodes RE.

For convenience of illustration, FIG. 4 shows only some of touch electrodes SEN (including driving electrodes TE and sensing electrodes RE), dummy patterns DME, and touch lines TLa, TLb and RL.

The main area MA of the touch sensing unit TSU includes a touch sensing area TSA for sensing a user's touch, and includes a touch peripheral area TPA disposed around the touch sensing area TSA. The touch sensing area TSA may overlap the display area DA illustrated in FIGS. 1 to 3, and the touch peripheral area TPA may overlap the non-display area NDA.

In the touch sensing area TSA, the driving electrodes TE, the sensing electrodes RE and the dummy patterns DME are disposed. The driving electrodes TE and the sensing electrodes RE may form mutual capacitance to sense a touch of an object or a person.

The sensing electrodes RE may be arranged in the first direction (x-axis direction) and the second direction (y-axis direction). The sensing electrodes RE in a same row may be electrically connected to one another in the first direction (x-axis direction). The sensing electrodes RE adjacent to one another in the second direction (y-axis direction) in a same column/set may be electrically separated from one another. Touch nodes where mutual capacitance is formed may be disposed at intersections of columns/sets of the driving electrodes TE and rows/sets of the sensing electrodes RE.

The driving electrodes TE may be arranged in the first direction (x-axis direction) and second direction (y-axis direction). The driving electrodes TE adjacent to one another in the first direction (x-axis direction) in a same row may be electrically separated from one another. The driving electrodes TE in a same column may be electrically connected to one another in the second direction (y-axis direction). The driving electrodes TE adjacent to one another in the second direction (y-axis direction) may be connected through connection electrodes CE.

Each of the dummy patterns DME (or dummy members DME) may be surrounded by a driving electrode TE or a sensing electrode RE. Each of the dummy patterns DME may be electrically separated from the driving electrode TE or the sensing electrode RE. Each of the dummy patterns DME may be spaced from the driving electrode TE or the sensing electrode RE. Each of the dummy patterns DME may be electrically floating.

The driving electrodes TE, the sensing electrodes RE, and the dummy patterns DME each have a rhombus shape, a quadrangular shape, a polygonal shape, a circle shape, and/or an ellipse when in a plan view of the touch sensing unit TSU.

The touch lines TLa, TLb and RL may be disposed in the sensor peripheral area TPA. The touch lines TLa, TLb and RL include first touch driving lines TLa and second touch driving lines TLb connected to the driving electrodes TE, and touch sensing lines RL connected to the sensing electrodes RE.

The sensing electrodes RE disposed on one side of the touch sensor area TSA may be connected to the touch sensing lines RL, respectively. The sensing electrodes RE electrically connected with one another in the first direction (x-axis direction) may be electrically connected to the same sensing line RL. The touch sensing lines RL may be electrically connected to the touch driver circuit 400 through a separate pad area.

The driving electrodes TE disposed at one end of the touch sensor area TSA may be connected to the first driving lines TLa, respectively; the driving electrodes TE disposed at the opposite end of the touch sensor area TSA may be connected to the second driving lines TLb, respectively. The driving electrodes TE electrically connected to one another in the second direction (y-axis direction) may be electrically connected to the same first touch driving line TLa and the same second touch driving line TLb. The second touch driving lines TLb may include sections extending parallel to a first side of the touch sensing area TSA and may be connected to the driving electrodes TE at a second side of the touch sensing area TSA. The first touch driving lines TLa and the second touch driving lines TLb may be electrically connected to the touch driver circuit 400 through the separate pad area.

The driving electrodes TE are connected to the first and second touch driving lines TLa and TLb on two opposite sides of the touch sensing area TSA to receive touch driving signals. Accordingly, it is possible to prevent a difference between the touch driving signals applied to the driving electrodes TE disposed on the two opposite sides of touch sensing area TSA due to a RC delay of the touch driving signals.

Figure 5:
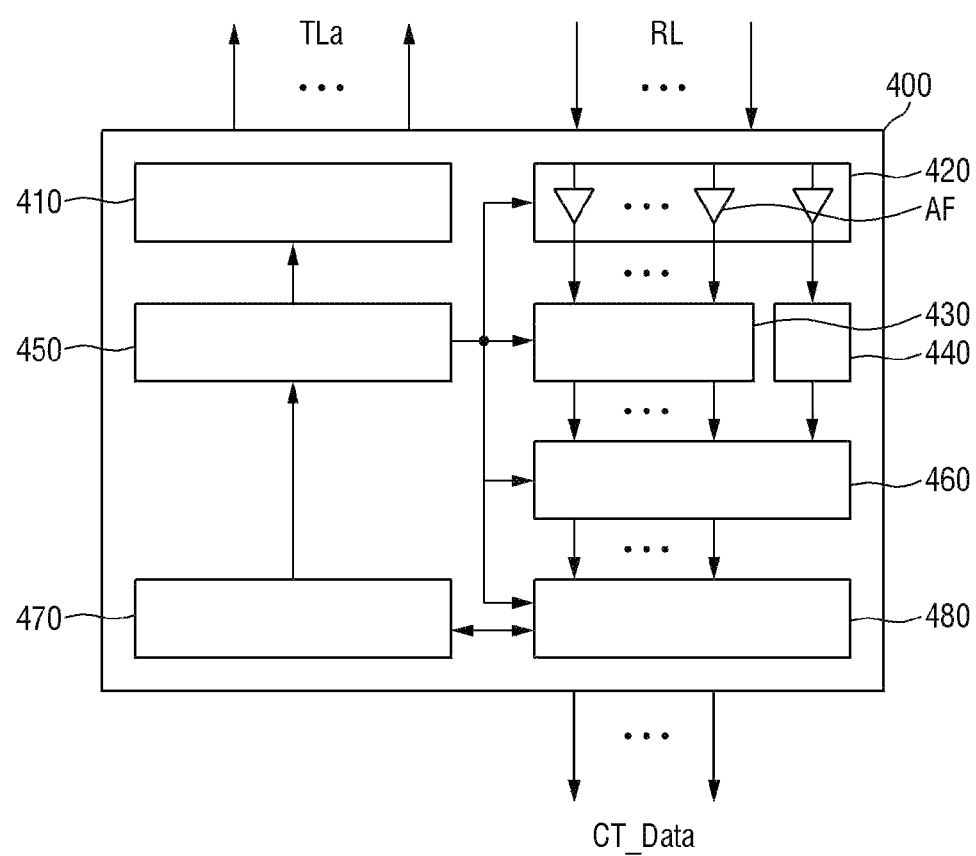
FIG. 5 is a block diagram showing the touch driver circuit shown in FIGS. 1 and 2 according to an embodiment.

FIG. 5 is a block diagram showing the touch driver circuit shown in FIGS. 1 and 2 according to an embodiment.

Referring to FIG. 5, the touch driver circuit 400 includes a driving signal output 410, a sensing circuit 420, an analog-to-digital converter 430, a current detector unit 440, a touch driving controller 450, a code signal detector 460, a driving mode setter 470, and a touch data output 480. At least some of the components are electrically connected to each other.

The driving signal output 410 supplies touch driving signals to the driving electrodes TE of the touch sensing unit TSU through the first and second touch driving lines TLa and TLb under the control of the touch driving controller 450.

The driving signal output 410 supplies the touch driving signals from the driving electrode TE disposed at the leftmost position of the touch sensing area TSA to the driving electrode TE disposed at the rightmost position in response to a touch driving control signal from the touch driving controller 450. The driving signal output 410 may sort the driving electrodes TE into groups each having a predetermined number of driving electrodes TE in response to the touch driving control signal, and may simultaneously supply touch driving signals to the driving electrodes TE in the groups. The touch driving signals may be synchronized with a predetermined driving frequency and may be supplied as pulse signals with a magnitude of approximately 1.8 V.

While the touch driving signals are supplied to the touch electrodes in the groups, the driving signal output 410 supplies predetermined code signal(s) for at least one touch electrode in response to a code output control signal from the touch driving controller 450. The code signal(s) supplied to at least one touch electrode may be a signal in anti-phase with the touch driving electrodes or a negative signal.

The driving signal output 410 may sequentially output the touch driving signals from the driving electrode TE disposed at the leftmost position to the driving electrode TE disposed at the rightmost position in at least one frame in response to the touch driving control signal from the touch driving controller 450.

The sensing circuit 420 senses the amount of a change in the capacitance of touch nodes from the touch sensing lines RL of the touch sensing unit TSU. The sensing circuit 420 may include operational amplifiers AF for sensing the amount of a change in the capacitance of the touch nodes. The operational amplifiers AF may be connected to the touch sensing lines RL, respectively.

The analog-to-digital converter 430 sequentially converts the voltages output from the touch sensing lines RL amplified by the operational amplifiers AF of the sensing circuit 420, i.e., output voltages according to the change in the amount of charges at the touch nodes into touch data, which is digital data.

The current detector unit 440 detects the amount of current from a touch signal amplified by the operational amplifiers AF of the sensing circuit 420. The current detector unit 440 may detect the amount of current using a current detector, and may share the detected amount of current with the code signal detector 460.

The code signal detector 460 detects predetermined code signals for the connected touch electrodes TE and RE from touch data sequentially input from the analog-to-digital converter 430. The code signal detector 460 detects code signals for different channels connected to the touch electrodes TE and RE from the touch data sequentially input from the analog-to-digital converter 430. The code signal detector 460 may check the position and coordinates of the channels connected to the touch electrodes TE and RE for the detected code signals, and may arrange the touch data according to the positions of the channels and the touch nodes.

The touch data output 480 compensates for the positions of the touch electrodes TE and RE and the touch data arranged for each of the touch nodes by the code signal detector 460 with a predetermined compensation algorithm or compensation data. The touch data output 480 calculates touch position coordinate information CT_Data from the positions of the touch electrodes TE and RE and the touch data arranged for each of the touch nodes, and supplies the touch position coordinate information CT_Data to the display driver circuit 200.

The touch driving controller 450 controls the driving timing of the driving signal output 410, the sensing circuit 420, the analog-to-digital converter 430, and the data output 480 in response to driving setting signals from the driving mode setter 470. In response to the driving setting signals, the touch driving controller 450 supplies to the driving signal output 410 the touch driving control signal and the code output control signal for the driving electrodes TE in the order and period corresponding to the driving setting signals. The touch driving controller 450 controls the driving signal output 410 so that the touch driving signals are supplied to all of the driving electrodes TE by the driving signal output 410 group by group or sequentially according to the driving setting signals from the driving mode setter 470.

The driving mode setter 470 sets and changes driving modes or driving schemes for all of the driving electrodes TE, and supplies driving setting signals associated with the set and changed driving schemes to the touch driving controller 450.

The driving mode setter 470 may set the number of driving electrodes TE in each group (to be simultaneously driven) among all of the driving electrodes TE, and may supply a first driving setting signal to the touch driving controller 450 so that the touch driving signals are supplied simultaneously to the driving electrodes TE in a group during at least one frame period. The groups may be driven sequentially, in a predetermined order, or randomly. The driving electrodes TE of each of the groups are driven simultaneously.

The driving mode setter 470 may generate a second driving setting signal and supply it to the touch driving controller 450 so that the touch driving signals are sequentially supplied to all of the driving electrodes TE during at least one frame period.

The driving mode setter 470 may supply the first and second driving setting signals to the touch driving controller 450 by combining or alternating them at least every frame so that the group-wise (or group-based) driving scheme and the sequential driving scheme for all of the driving electrodes TE can be combined or alternated at least every frame.

When the group-wise driving scheme is applied for all of the driving electrodes TE, the driving mode setter 470 may change the number of simultaneously driven driving electrodes TE at least every frame so that the number of driving electrodes TE in each group (to be simultaneously driven) among all of the driving electrodes TE is changed at least every frame. The driving mode setter 470 may change the number of codes (or code sizes) of the first driving setting signal at least every frame according to the changed number of the driving electrodes TE simultaneously driven and supply it to the touch driving controller 450.

The driving mode setter 470 may set the number of driving electrodes TE in each group (to be simultaneously driven) among all of the driving electrodes TE, and may provide a third driving setting signal to the touch driving controller 450 so that predetermined code signals are sequentially or simultaneously supplied to at least one driving electrode TE among the driving electrodes TE in each group. Since the code signals sequentially or simultaneously supplied to at least one driving electrode TE may be in anti-phase with the touch driving signals or may be negative signals, the amount of the EMI radiation can be reduced due to electromagnetic cancellation between the code signals and the touch driving signals.

The driving mode setter 470 may change the number and the order of code signals to be output at least every frame so that the number and the order of the driving electrode TE to which the code signals are supplied among the driving electrode TE in each group are changed at least every frame. Depending on the number and order of the code signals that are changed at least every frame period, the driving mode setter 470 may change the sum of phases (or net value) of the third driving setting signals and the order at least every frame, to supply the sum and the order to the touch driving controller 450.

The driving mode setter 470 may supply the first and third driving setting signals to the touch driving controller 450 by combining or alternating them at least every frame so that the number of the driving electrodes TE in each group and the sum of phases and the order of the driving electrodes TE in each group are changed at least every frame. The driving mode setter 470 changes the number of codes (or code size) of the first driving setting signal supplied to the touch driving controller 450 which are combined or alternated at least every frame, and the sum of phases (or net value) of the third driving setting signal at least every frame, to supply the number of codes and the sum of phases to the touch driving controller 450.

FIG. 6 is a diagram showing different touch driving schemes of a touch driver circuit according to a first embodiment.

Referring to FIG. 6, the driving mode setter 470, for a first driving scheme (alternating driving), supplies to the touch driving controller 450 the first and second driving setting signals alternately every frame so that a group-wise driving scheme (number of simultaneous driving channels=k) and a sequential driving scheme (sequential driving: number of simultaneous driving channels=1) for the all of the driving electrodes TE are applied and performed alternately every frame. The term "simultaneous driving channels" may mean "simultaneously driven channels." A channel may correspond to and/or may be equivalent to a column of electrodes.

The driving mode setter 470 may supply the first driving setting signal to the touch driving controller 450 so that all of the driving electrodes TE are driven in the group-wise driving scheme (number of simultaneous driving channels=k) in the odd-numbered frame periods (e.g., the first and third frame periods 1Frame and 3Frame). The driving mode setter 470 may supply the second driving setting signal to the touch driving controller 450 so that all of the driving electrodes TE are driven in the sequential driving scheme (number of simultaneous driving channels=1) in the even-numbered frame periods (e.g., the second and fourth frame periods 2Frame and 4Frame).

Figure 7:
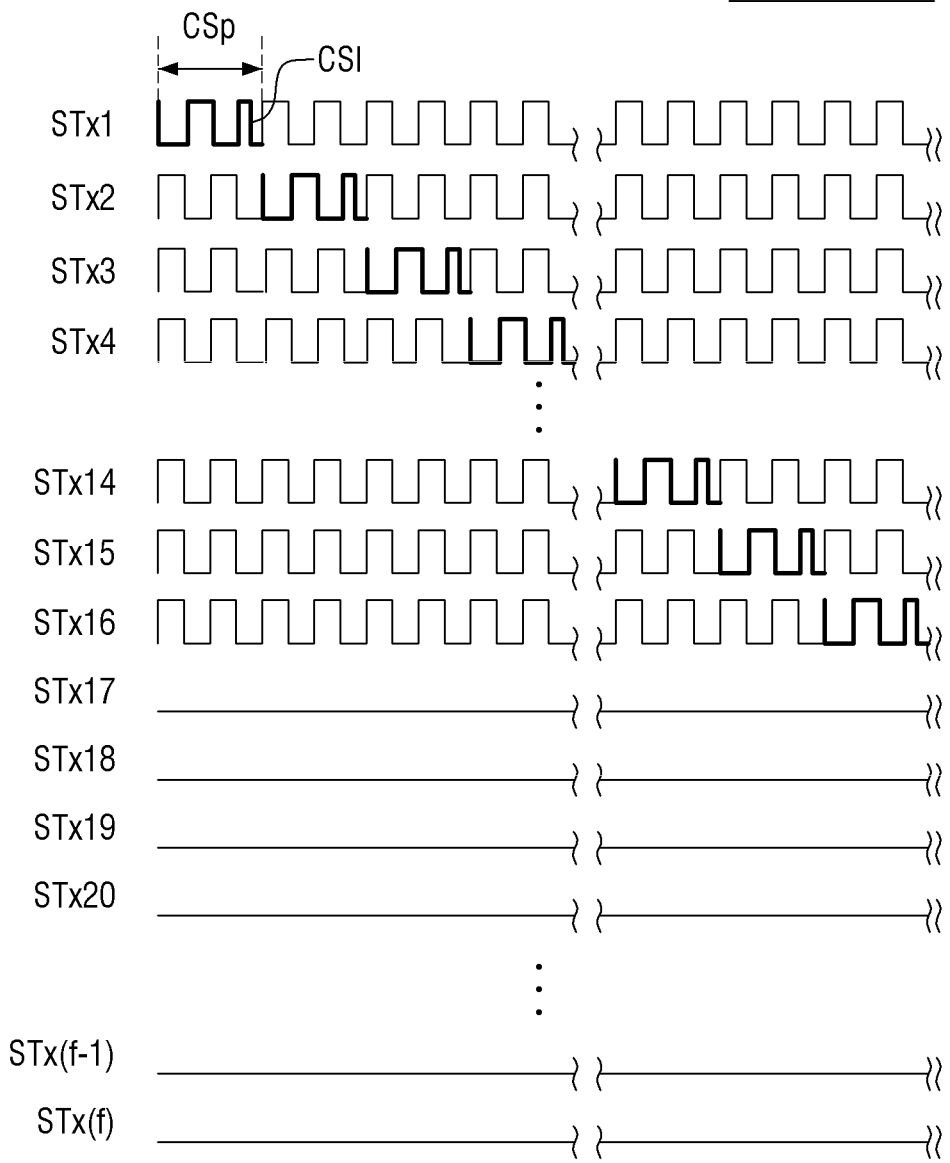
FIG. 7 is a timing diagram illustrating code signals and touch driving signals supplied to the touch driving electrodes in one of the frame periods shown in FIG. 6 according to an embodiment.

FIG. 7 is a timing diagram illustrating code signals and touch driving signals supplied to the touch driving electrodes in one of the frame periods shown in FIG. 6 according to an embodiment.

FIG. 7 shows waveforms of touch driving signals STx1, STx2, STx3, STx4, . . . STx14, STx15, STx16, STx17, STx18, STx19, STx20, . . . , STx(f-1), and STx(f) and code signals CSI supplied to the driving electrodes TE during a first frame period 1Frame in which the group-wise driving scheme for the driving electrodes TE is applied, where f is the total number of all driving electrodes TE.

The driving mode setter 470 sets the number of driving electrodes TE in each group (to be simultaneously driven) among all of the driving electrodes TE to k, and may supply the first driving setting signal to the touch driving controller 450 so that the touch driving signals STx1 to STx16 are supplied simultaneously to k driving electrodes TE in each group, where k may be 16.

Referring to FIG. 7, the driving signal output 410 sequentially drives the groups each having sixteen driving electrodes TE during the first frame period 1Frame in response to the touch driving control signal of the touch driving controller 450. The touch driving signals STx1 to STx16 are simultaneously supplied to the sixteen driving electrodes TE (or sixteen columns of driving electrodes TE) included in each of the groups, which are sequentially driven.

The driving signal output 410 may drive the groups each having sixteen driving electrodes TE in a predetermined order or in a random order during the first frame period 1Frame in response to the touch driving control signal of the touch driving controller 450. The touch driving signals are simultaneously supplied to the driving electrodes TE included in each of the groups driven in a predetermined order or in a random order.

The driving mode setter 470 may set code output period CSp information for each channel and supply it to the touch driving controller 450 so that the predetermined code signals CSI are sequentially or simultaneously supplied to at least one driving electrode TE among the driving electrodes TE in each group (and simultaneously driven). When the touch driving signals STx1 to STx16 are supplied to sixteen driving electrodes TE in each of the groups, the driving signal output 410 supplies code signals CSI to the sixteen driving electrodes TE in order to identify the position of each of the driving electrodes TE. The driving signal output unit 410 may sequentially or simultaneously supply the code signals CSI to the driving electrodes TE according to the code output period CSp information for each channel.

Once all of the touch driving signals STx1 to STx16 and the code signals CSI are supplied to the driving electrodes TE of the first group including the sixteen driving electrodes TE, touch driving signals and code signals may be supplied to sixteen driving electrodes TE included in the next group, i.e., a second group, and so on.

Figure 8:
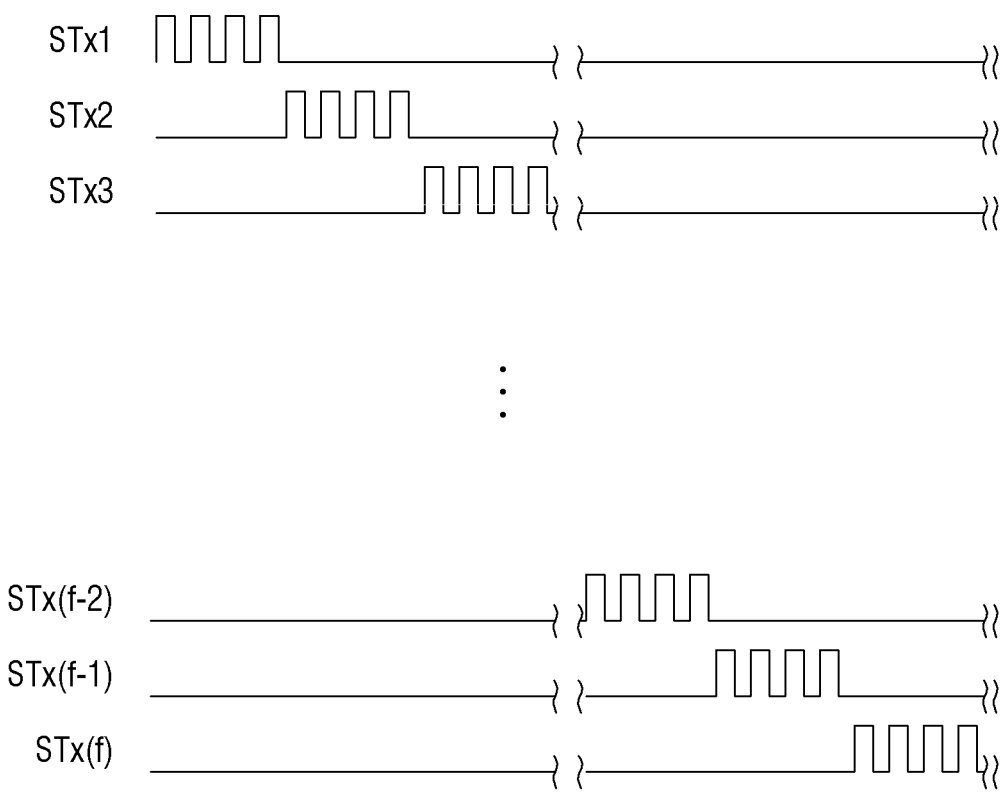
FIG. 8 is a timing diagram illustrating touch driving signals sequentially supplied to touch driving electrodes in one of the frame periods shown in FIG. 6 according to an embodiment.

FIG. 8 is a timing diagram illustrating touch driving signals sequentially supplied to touch driving electrodes in one of the frame periods shown in FIG. 6 according to an embodiment.

FIG. 8 shows waveforms of touch driving signals STx1, STx2, STx3, ... STx(f-2), STx(f-1), and STx(f) supplied to the driving electrodes TE during a second frame period 2Frame, in which the sequential driving scheme for the driving electrodes TE is applied.

The driving mode setter 470 may supply the second driving setting signal to the touch driving controller 450 so that the touch driving signals STx1 to STx16 are sequentially supplied to all of the driving electrodes TE during the second frame period 2Frame.

The touch driving controller 450 supplies a touch driving control signal corresponding to the second driving setting signal to the driving signal output 410, and the driving signal output 410 sequentially supplies the touch driving signals STx1 to STx16 to the driving electrodes TE in response to the touch driving control signal. When the driving electrodes TE are sequentially driven, it is not necessary to identify the positions of the driving electrodes TE, and thus no code output control signal is generated.

Referring to FIGS. 6, 7, and 8, the driving mode setter 470, for a second driving scheme (sequential insertion driving), supplies to the touch driving controller 450 the first and second driving setting signals by combining them over different frames so that a group-wise driving scheme (number of simultaneous driving channels=k) and a sequential driving scheme (sequential driving: number of simultaneous driving channels=1) for the all of the driving electrodes TE are performed for different frames.

Referring to FIG. 6, the driving mode setter 470 may supply the first driving setting signal to the touch driving controller 450 so that all of the driving electrodes TE are driven in the group-wise driving scheme during frame periods (e.g., first to third frame periods 1Frame to 3Frame). The driving mode setter 470 may supply the second driving setting signal to the touch driving controller 450 so that all of the driving electrodes TE are sequentially driven in at least one frame period (e.g., the fourth frame period 4Frame).

When the second driving scheme (sequential insertion driving) of the driving mode setter 470 is applied, all of the driving electrodes TE may be driven in the group-wise driving scheme during some frame periods and may be driven in the sequential driving scheme during at least another frame period.

For a third driving scheme (channel number modulation driving), the number of driving electrodes TE in each group to be simultaneously driven may be changed at least every frame.

The driving mode setter 470 may change the number of simultaneously driven driving electrodes TE at least every frame so that the number of driving electrodes TE in each group is changed at least every frame. The driving mode setter 470 may change the number of codes (or code sizes) of the first driving setting signal at least every frame according to the changed number of the driving electrodes TE simultaneously driven and supply it to the touch driving controller 450.

The driving mode setter 470, for the first frame period 1Frame, sets the number of driving electrodes TE in each group to k, and may change the number of the codes of the first driving setting signal to k so that the touch driving signals STx1 to STx16 are supplied simultaneously to k driving electrodes TE in each group, where k may be 16.

Subsequently, the driving mode setter 470, for the second frame period 2Frame, sets the number of driving electrodes TE in each group to 1, and changes the number of the codes of the first driving setting signal to 1 so that the touch driving signals STx1 to STx10 are supplied simultaneously to 1 driving electrodes TE in each group, where 1 may be smaller than k and may be 10.

Subsequently, the driving mode setter 470, for the third frame period 3Frame, sets the number of driving electrodes TE in each group to m, and changes the number of the codes of the first driving setting signal to m so that the touch driving signals STx1 to STx4 are supplied simultaneously to m driving electrodes TE in each group, where m may be smaller than 1 and may be 4.

Subsequently, the driving mode setter 470, for the fourth frame period 4Frame, sets the number of driving electrodes TE in each group to n, and changes the number of the codes of the first driving setting signal to n so that the touch driving signals STx1, STx2, and/or STx3 are supplied simultaneously to n driving electrodes TE in each group, where n may be smaller than m and may be 1 to 3.

The driving mode setter 470 may change the number of codes of the first driving setting signal according to the number of driving electrodes TE in each group, which can be (periodically) changed to k, 1, m, or n every one or more frames.

Figure 9:
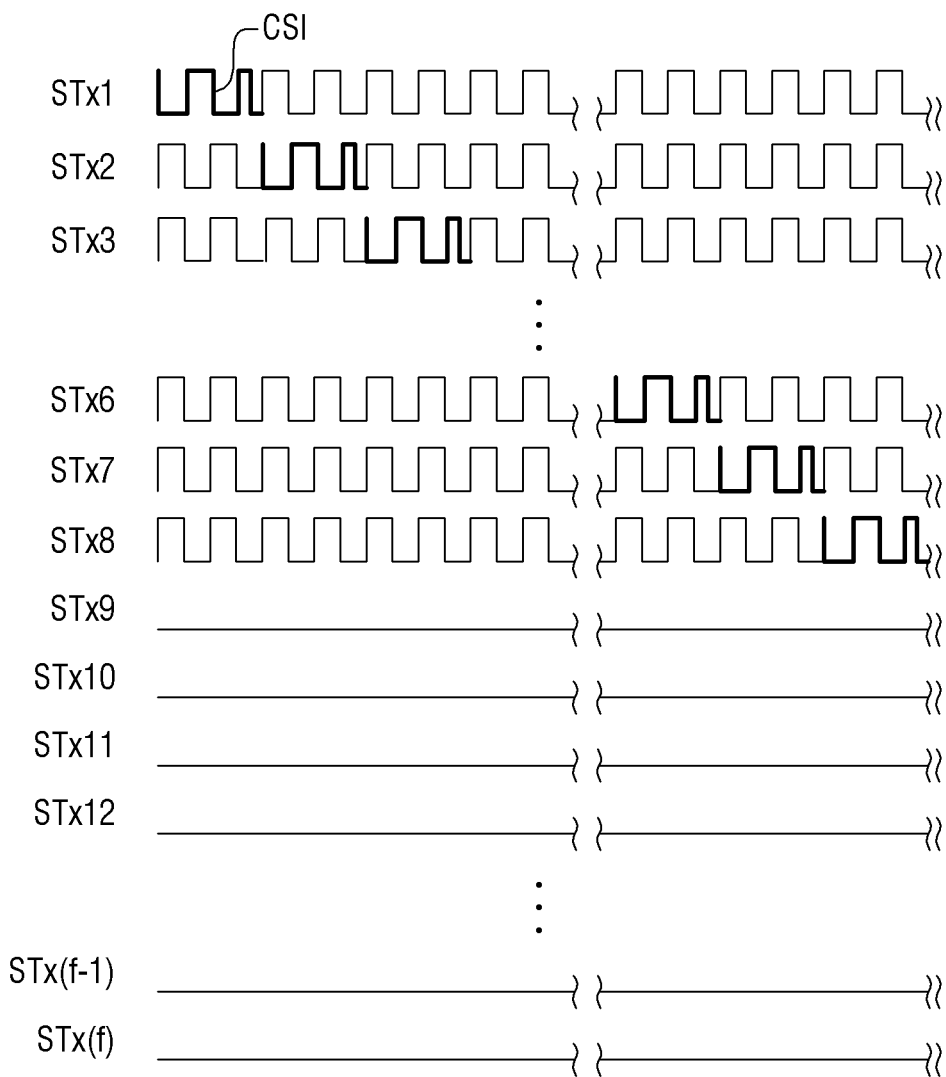
FIG. 9 is a timing diagram illustrating code signals and touch driving signals supplied to touch driving electrodes in one of the frame periods shown in FIG. 6 according to an embodiment.

FIG. 9 is a timing diagram illustrating code signals and touch driving signals supplied to touch driving electrodes in one of the frame periods shown in FIG. 6 according to an embodiment.

FIG. 9 shows waveforms of touch driving signals STx1 to STx(f) and code signals CSI supplied to the driving electrodes TE during the second frame period 2Frame in which the driving electrodes TE in each group are simultaneously driven when the third driving scheme (channel number modulation driving) of FIG. 6 is applied.

The driving mode setter 470 sets the number of the driving electrodes TE in each group to 1 in the second frame period 2Frame. The driving mode setter 470 changes the number of codes of the first driving setting signal to 1 and supply the number to the touch driving controller 450. The number of codes is equal to the number of the touch driving signals STx1 to STx8 simultaneously supplied to the driving electrodes TE in each group having 1 driving electrodes, where 1 may be 8.

Referring to FIG. 9, the driving signal output 410 sequentially drives the groups each having eight driving electrodes TE during the second frame period 2Frame in response to the touch driving control signal of the touch driving controller 450. The touch driving signals STx1 to STx8 are simultaneously supplied to the eight driving electrodes TE included in each of the groups which are sequentially driven.

When the touch driving signals STx1 to STx8 are supplied to eight driving electrodes TE in each of the groups, the driving signal output 410 supplies code signals CSI to the eight driving electrodes TE in order to identify the positions of driving electrodes TE.

Once all of the touch driving signals STx1 to STx8 and the code signals CSI are supplied to the driving electrodes TE of the first group including the eight driving electrodes TE, touch driving signals and code signals may be supplied to eight driving electrodes TE included in the next group, i.e., a second group, and so on.

Figure 10:
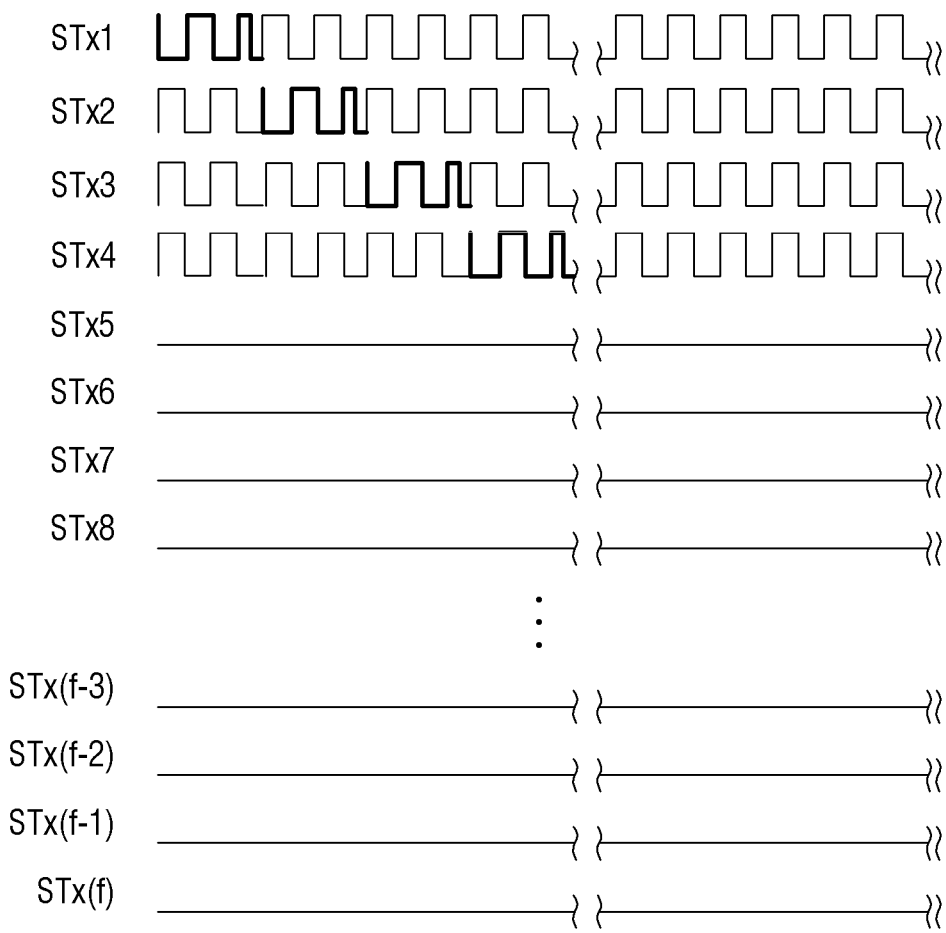
FIG. 10 is a timing diagram illustrating code signals and touch driving signals supplied to touch driving electrodes in one of the frame periods shown in FIG. 6 according to an embodiment.

FIG. 10 is a timing diagram illustrating code signals and touch driving signals supplied to touch driving electrodes in another one of the frame periods shown in FIG. 6 according to an embodiment.

FIG. 10 shows waveforms of touch driving signals STx1 to STx(f) and code signals CSI supplied to the driving electrodes TE during the third frame period 3Frame, in which the driving electrodes TE in each group are simultaneously driven when the third driving scheme (channel number modulation driving) of FIG. 6 is applied.

The driving mode setter 470 sets the number of the driving electrodes TE in each group to m in the third frame period 3Frame. The driving mode setter 470 changes the number of codes of the first driving setting signal to m to supply it to the touch driving controller 450. The number of codes is equal to the number of the touch driving signals STx1 to STx4 simultaneously supplied to the driving electrodes TE in each group having m driving electrodes, where m may be 4.

Referring to FIG. 10, the driving signal output 410 sequentially drives the groups each having four driving electrodes TE during the third frame period 3Frame in response to the touch driving control signal of the touch driving controller 450. The touch driving signals STx1 to STx4 are simultaneously supplied to the four driving electrodes TE included in each of the groups, which are sequentially driven.

When the touch driving signals STx1 to STx4 are supplied to four driving electrodes TE in each of the groups, the driving signal output 410 supplies code signals CSI to the four driving electrodes TE in order to identify positions of the driving electrodes TE.

Once all of the touch driving signals STx1 to STx4 and the code signals CSI are supplied to the driving electrodes TE of the first group including the four driving electrodes TE, touch driving signals and code signals may be supplied to four driving electrodes TE included in the next group, i.e., a third group, and so on.

Figure 11:
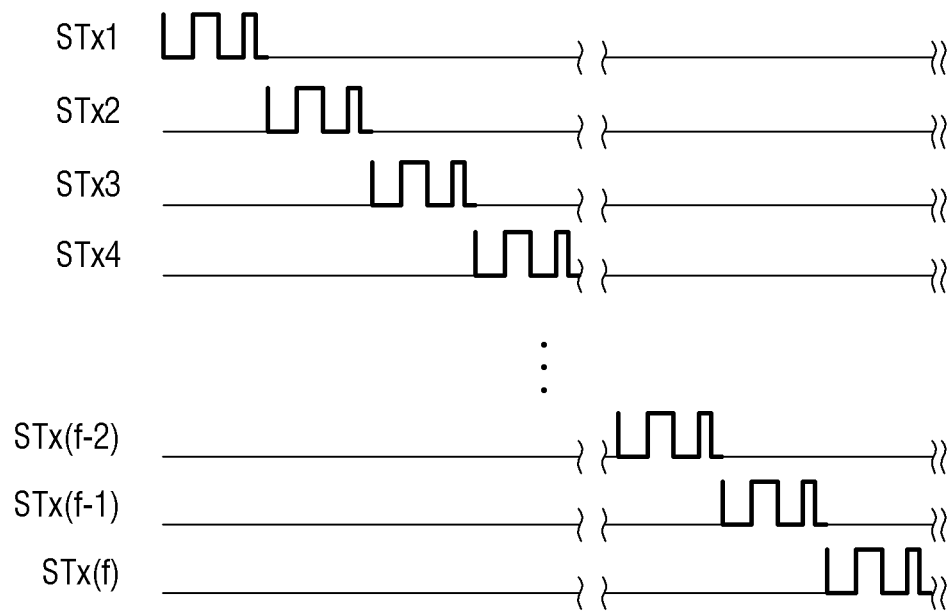
FIG. 11 is a timing diagram illustrating code signals and touch driving signals supplied to touch driving electrodes in one of the frame periods shown in FIG. 6 according to an embodiment.

FIG. 11 is a timing diagram illustrating code signals and touch driving signals supplied to touch driving electrodes in one of the frame periods shown in FIG. 6 according to an embodiment.

FIG. 11 shows waveforms of touch driving signals STx1 to STx(f) supplied to the driving electrodes TE during the fourth frame period 4Frame, in which the driving electrode(s) TE in each group are simultaneously driven when the third driving scheme (channel number modulation driving) of FIG. 6 is applied.

The driving mode setter 470 sets the number of the driving electrodes TE in each group to n in the fourth frame period 4Frame. Referring to FIG. 11, when n is set to 1, the driving electrodes TE may be sequentially driven. When the driving electrodes TE are sequentially driven, it is not necessary to identify the positions of the driving electrodes TE, and thus no code output control signal is necessary.

The driving mode setter 470 may change the number of codes of the first driving setting signal to supply it to the touch driving controller 450 so that the number of driving electrodes TE in each group can be periodically changed among k, l, m, and n frame by frame. Accordingly, the amount of EMI radiation generated by the touch driving signals can be adjusted frame by frame.

FIG. 12 is a view showing different touch driving schemes of a touch driver circuit according to a second embodiment.

Referring to FIG. 12, the driving mode setter 470, for a fourth driving scheme (alternating driving), may control the touch driving controller 450 and the driving signal output 410 so that the number of driving electrodes TE in each group (to be simultaneously driven) is maintained constant (e.g., twelve) and that code signal(s) CSI are simultaneously or sequentially supplied to at least one driving electrode TE among the driving electrodes TE in each group.

The driving mode setter 470, for the fourth driving scheme (alternating driving), changes the number and the order of the code signals CSI to be output at least every frame period so that the number and order of the driving electrodes TE to which the code signals CSI are supplied among the driving electrodes TE in each group are changed at least every frame. Depending on the number and order of the code signals CSI that are changed at least every frame period, the driving mode setter 470 may change the sum of phases (or net value) of the third driving setting signals and the order of the code signals to be output at least every frame, to supply them to the touch driving controller 450.

The driving mode setter 470 may set the number of driving electrodes TE in each group to 12 and set the sum of the phases (e.g., net value) to 1 (e.g., 8) in the odd-numbered frame periods (e.g., the first and third frame periods 1Frame and 3Frame). The driving mode setter 470 may set the number of driving electrodes TE in each group to 12 and set the sum of the phases (e.g., net value) to m (e.g., 4) in the even-numbered frame periods (e.g., the second and fourth frame periods 2Frame and 4Frame).

The driving mode setter 470 may change the sum of phases of the third driving setting signal between the odd-numbered frame periods and the even-numbered frame periods and supply the sum of phases to the touch driving controller 450.

Figure 13:
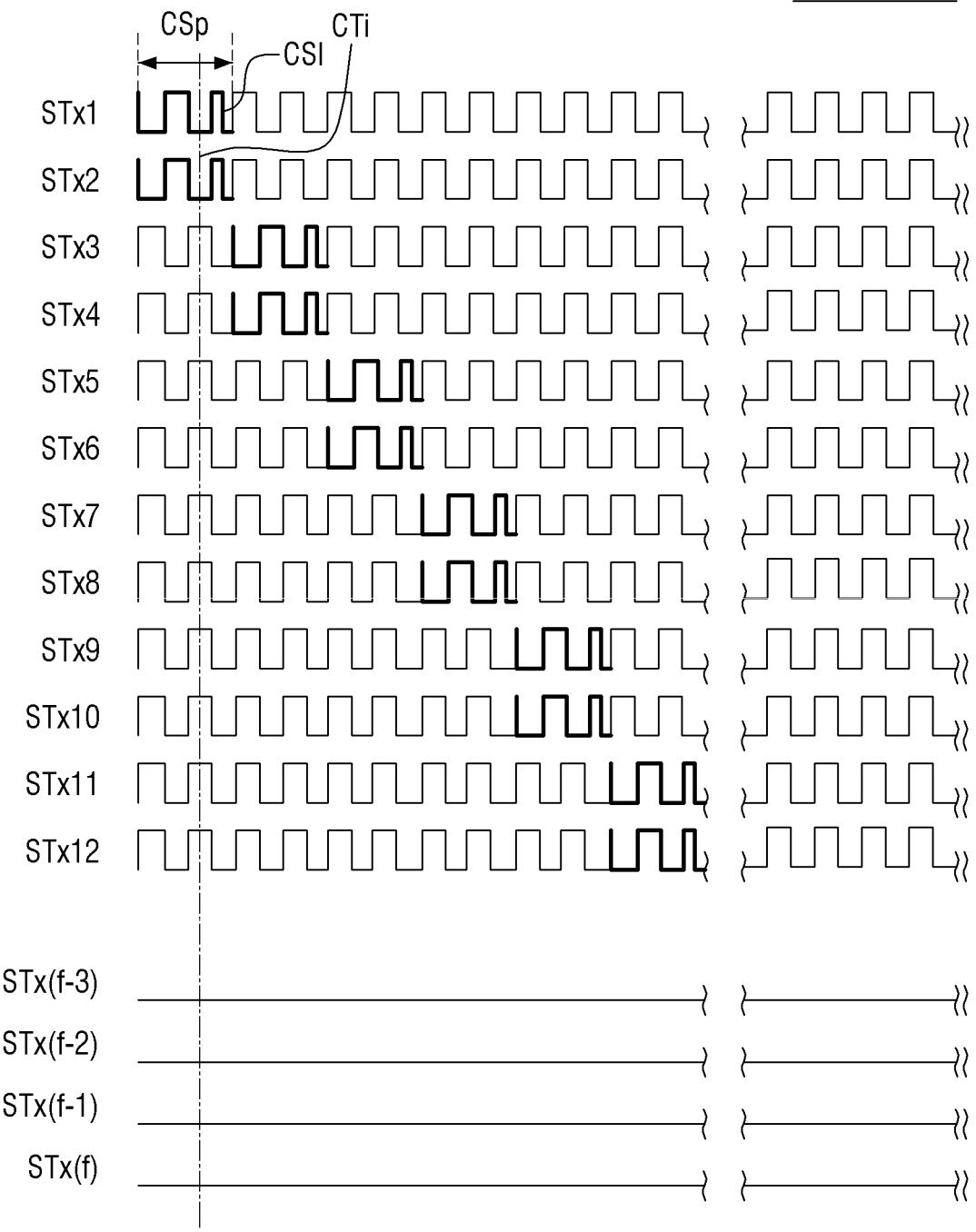
FIG. 13 is a timing diagram illustrating code signals and touch driving signals supplied to the touch driving electrodes in one of the frame periods shown in FIG. 12 according to an embodiment.

FIG. 13 is a timing diagram illustrating code signals and touch driving signals supplied to the touch driving electrodes in one of the frame periods shown in FIG. 12 according to an embodiment.

Referring to FIG. 13, the driving mode setter 470 may set the number of driving electrodes TE in each group (to be simultaneously driven) to 12 and set the sum of the phases (e.g., net value) to 1 (e.g., 8) in the odd-numbered frame periods (e.g., the first and third frame periods 1Frame and 3Frame). The code signals CSI are simultaneously supplied to two driving electrodes TE among the twelve driving electrodes TE, and the phases of the two touch driving signals can be cancelled during a period SCp in which two code signals CSI are simultaneously supplied. The phases of two touch driving signals may be cancelled during the period SCp or the time point CTi in which two code signals CSI are simultaneously supplied. Since the code signals CSI sequentially or simultaneously supplied to at least one driving electrode TE may be in anti-phase with the touch driving signals or may be negative signals, the amount of the EMI radiation can be reduced due to electromagnetic cancellation between the code signals CSI and the touch driving signals.

Referring to FIG. 13, since the phases of some of the touch driving signals are cancelled by the code signals CSI, the sum of phases (e.g., 8) of the driving electrodes TE that are simultaneously driven may be equal to the number of phases. The sum of phases of the driving electrodes TE may be equal to the number of phases of 8 during the odd-numbered frame periods.

Figure 14:
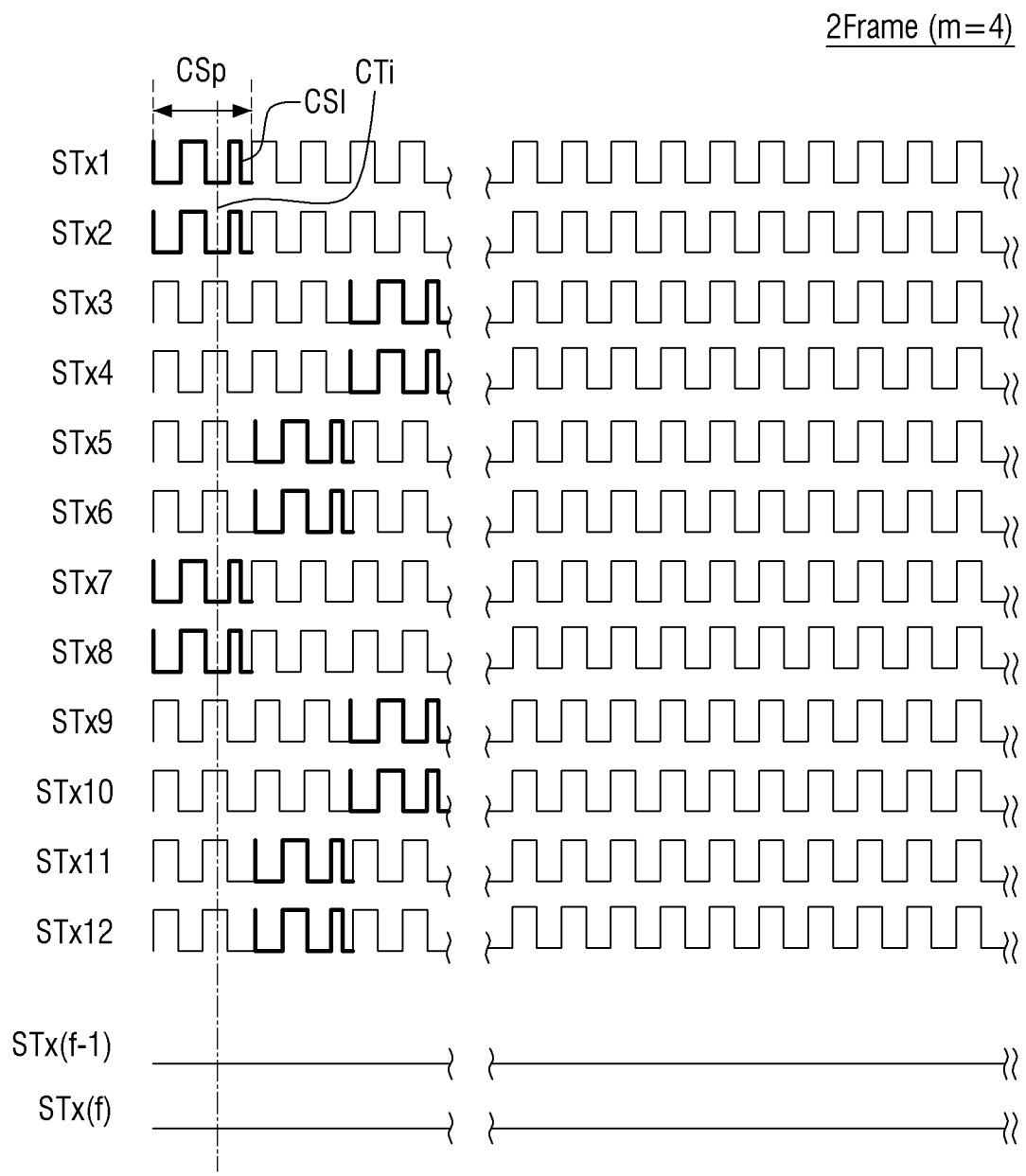
FIG. 14 is a timing diagram illustrating code signals and touch driving signals supplied to touch driving electrodes in one of the frame periods shown in FIG. 13 according to an embodiment.

FIG. 14 is a timing diagram illustrating code signals and touch driving signals supplied to touch driving electrodes in one of the frame periods shown in FIG. 13 according to an embodiment.

Referring to FIG. 14, the driving mode setter 470 may set the number of driving electrodes TE in each group that are simultaneously driven to 12 and set the sum of the phases (e.g., net value) to m (e.g., 4) in the even-numbered frame periods (e.g., the second and fourth frame periods 2Frame and 4Frame).

The code signals CSI are simultaneously supplied to four driving electrodes TE among the twelve driving electrodes TE, and the phases of the four touch driving signals can be cancelled during a period SCp or a time point CTi in which four code signals CSI are simultaneously supplied. Since the phases of four touch driving signals are cancelled during the period SCp or time CTi in which the four code signals CSI are supplied simultaneously, the sum of phases (for example, four) of the driving electrodes TE that are simultaneously driven may be equal to the number of phases of m. The sum of phases of the driving electrodes TE may be equal to the number of phases of 4 during the even-numbered frame periods.

Referring to FIGS. 13 and 14, the driving mode setter 470, as the fourth driving scheme (sequential insertion driving), may change the sum of phases and the order and supply them to the touch driving controller 450 so that the sum of the phases of the driving electrodes TE are changed alternately between the odd-numbered frame periods and the even-numbered frame periods.

Referring to FIGS. 12, 13, and 14, the driving mode setter 470 may change the sum of phases (e.g., net value) of the third driving setting signal each several frames and may supply the sum of phases to the touch driving controller 450 so that the sum of phases of the driving electrodes TE that are simultaneously driven may be selected between 1 (e.g., 8) and m (e.g., 4).

In the fifth driving scheme (sequential insertion driving) shown in FIG. 12, the driving mode setter 470 may set the sum of phases of the third driving setting signal to 1 to supply it to the touch driving controller 450 so that the sum of phases of the driving electrode TE that are simultaneously driven is 1 (e.g., 8) over several frame periods (e.g., the first to third frame periods 1Frame to 3Frame). The driving mode setter 470 may set the sum of phases of the third driving setting signal to m to supply it to the touch driving controller 450 so that the sum of phases of the driving electrode TE that are simultaneously driven is m (e.g., 4) in at least one frame period (e.g., the fourth frame period 4Frame). Accordingly, in the fifth driving scheme (sequential insertion driving) of the driving mode setter 470, the sum of the phases of driving electrodes TE that are simultaneously driven is 1 (e.g., 8) in several frame periods, and the sum of the phases of driving electrodes TE that are simultaneously driven is m (e.g., 4) in at least another frame period.

Referring back to FIG. 12, the driving mode setter 470, for a sixth driving scheme (channel number modulation driving), the sum of phases (e.g., net value) of the driving electrodes TE that are simultaneously driven may be changed at least every frame when the group-wise driving scheme for all of the driving electrodes TE is applied.

The driving mode setter 470 may change the sum of phase of the driving electrodes TE at least every frame so that the sum of phases of the driving electrodes TE in each group (to be simultaneously driven) is changed at least every frame. The driving mode setter 470 may change the sum of phases of the third driving setting signal at least every frame according to the changed sum of phases of the driving electrodes TE simultaneously driven and supply it to the touch driving controller 450.

The driving mode setter 470 sets the sum of phases of the driving electrodes TE in each group to j in the first frame period 1Frame, and supplies the third driving setting signal with the sum of phases set to j to the touch driving controller 450 so that code signals CSI are sequentially supplied to the driving electrode TE in each group, where j may be 10.

Subsequently, the driving mode setter 470 sets the sum of phases of the driving electrodes TE in each group to 1 in the second frame period 2Frame, and supplies the third driving setting signal with the sum of phases set to 1 to the touch driving controller 450 so that code signals CSI are simultaneously supplied to two driving electrode TE in each group, where 1 may be smaller than j and may be 8.

Subsequently, the driving mode setter 470 sets the sum of phases of the driving electrodes TE in each group to m in the third frame period 3Frame, and supplies the third driving setting signal with the sum of phases set to m to the touch driving controller 450 so that code signals CSI are simultaneously supplied to four driving electrode TE in each group, where m may be smaller than 1 and may be 4.

Subsequently, the driving mode setter 470 sets the sum of phases of the driving electrodes TE in each group to n in the fourth frame period 4Frame, and supplies the third driving setting signal with the sum of phases set to n to the touch driving controller 450 so that code signals CSI are simultaneously supplied to five driving electrode TE in each group, where n may be smaller than m and may be 2.

The driving mode setter 470 may change the sum of phases of the third driving setting signal to supply it to the touch driving controller 450 so that the sum of phases of the driving electrodes TE in each group can be periodically changed to j, l, m, or n frame by frame.

FIG. 15 is a timing diagram illustrating code signals and touch driving signals supplied to touch driving electrodes in yet another one of the frame periods shown in FIG. 13 according to an embodiment.

FIG. 15 shows waveforms of touch driving signals STx1 to STx(f) and code signals CSI supplied to the driving electrodes TE during the first frame period 1Frame in which the driving electrodes TE in each group are simultaneously driven when the sixth driving scheme (channel number modulation driving) of FIG. 12 is applied.

The driving mode setter 470 sets the sum of phases of driving electrodes TE in each group to j (e.g., 10) in the first frame period 1Frame. The driving mode setter 470 supplies to the touch driving controller 450 a third driving setting signal with the sum of phases set to j so that the code signals CSI are sequentially supplied to the driving electrodes TE in each group.

Referring to FIG. 15, the driving signal output 410 sequentially drives the groups each having twelve driving electrodes TE during the first frame period 1Frame in response to the touch driving control signal of the touch driving controller 450. The touch driving signals STx1 to STx12 are simultaneously supplied to the twelve driving electrodes TE included in each of the groups, which are sequentially driven.

The driving signal output 410 supplies code signals CSI to every 1 driving electrodes TE when the touch driving signals STx1 to STx12 are supplied to twelve driving electrodes TE in each group. At this time, the touch driving controller 450 and the driving signal output 410 sequentially supplies the code signals CSI to the driving electrodes TE in each group in response to the third driving setting signal with the sum of phases set to j.

As the sum of phases (e.g., net value) is set to j (e.g., 10) in the first frame period 1Frame, the code signals CSI are sequentially supplied to every 1 driving electrodes among twelve driving electrodes TE, and the phase of other 1 touch driving signals may be cancelled during the period SCp in which 1 code signals CSI are supplied. Since the phases of other 1 touch driving signals are cancelled during the period SCp or time CTi in which the 1 code signals CSI are supplied, the sum of phases (for example, ten) of the driving electrodes TE that are simultaneously driven may be equal to the number of phases of j.

Subsequently, the driving mode setter 470 changes the sum of phases of driving electrodes TE in each group to 1 (e.g., 8) in the second frame period 2Frame. The driving mode setter 470 supplies to the touch driving controller 450 a third driving setting signal with the sum of phases set to 1 so that the code signals CSI are selectively supplied to the driving electrodes TE in each group.

Referring back to FIG. 13, the driving signal output 410 sequentially drives the groups each having 12 driving electrodes TE in response to the touch driving control signal of the touch driving controller 450. The touch driving signals STx1 to STx12 are simultaneously supplied to the twelve driving electrodes TE included in each of the groups which are sequentially driven.

The driving signal output 410 supplies code signals CSI to two driving electrodes TE while the touch driving signals STx1 to STx12 are supplied to twelve driving electrodes TE in each group. At this time, the touch driving controller 450 and the driving signal output 410 simultaneously supplies the code signals CSI to every two driving electrodes among the driving electrodes TE in each group in response to the third driving setting signal with the sum of phases set to 1.

As the sum of phases (e.g., net value) is set to 1 (e.g., 8) in the second frame period 2Frame, the code signals CSI are simultaneously supplied to every two driving electrodes among twelve driving electrodes TE, and the phase of other two touch driving signals may be cancelled during the period SCp in which two code signals CSI are supplied. Since the phases of other two touch driving signals are cancelled during the period SCp or time CTi in which two code signals CSI are supplied, the sum of phases (for example, eight) of the driving electrodes TE that are simultaneously driven may be equal to the sum of phases of 1.

Subsequently, the driving mode setter 470 changes the sum of phases of driving electrodes TE in each group to m (e.g., 4) in the third frame period 3Frame. The driving mode setter 470 supplies to the touch driving controller 450 a third driving setting signal with the sum of phases set to m so that the code signals CSI are selectively supplied to the driving electrodes TE in each group.

Referring back to FIG. 14, the driving signal output 410 sequentially drives the groups each having 12 driving electrodes TE in response to the touch driving control signal of the touch driving controller 450. The touch driving signals STx1 to STx12 are simultaneously supplied to the twelve driving electrodes TE included in each of the groups, which are sequentially driven.

The driving signal output 410 supplies code signals CSI to every four driving electrodes TE while the touch driving signals STx1 to STx12 are supplied to twelve driving electrodes TE in each group. At this time, the touch driving controller 450 and the driving signal output 410 supplies the code signals CSI to every four driving electrodes among the driving electrodes TE in each group in response to the third driving setting signal with the sum of phases set to m.

As the sum of phases (e.g., net value) is set to m (e.g., 4) in the third frame period 3Frame, the code signals CSI are simultaneously supplied to every four driving electrodes among twelve driving electrodes TE, and the phase of other four touch driving signals may be cancelled during the period SCp in which four code signals CSI are supplied. Since the phases of other four touch driving signals are cancelled during the period SCp or time CTi in which the four code signals CSI are supplied, the sum of phases (for example, four) of the driving electrodes TE that are simultaneously driven may be equal to the sum of phases of m.

FIG. 16 is a timing diagram illustrating code signals and touch driving signals supplied to touch driving electrodes in one of the frame periods shown in FIG. 13 according to an embodiment.

Referring to FIG. 16, the driving mode setter 470 changes the sum of phases of driving electrodes TE in each group to n (e.g., 2) in the fourth frame period 4Frame. The driving mode setter 470 supplies to the touch driving controller 450 a third driving setting signal with the sum of phases set to n so that the code signals CSI are selectively supplied to the driving electrodes TE in each group.

The driving signal output 410 sequentially drives the groups each having 12 driving electrodes TE in response to the touch driving control signal of the touch driving controller 450. The touch driving signals STx1 to STx12 are simultaneously supplied to the twelve driving electrodes TE included in each of the groups, which are sequentially driven.

The driving signal output 410 supplies code signals CSI to every five driving electrodes TE while the touch driving signals STx1 to STx12 are supplied to twelve driving electrodes TE in each group. At this time, the touch driving controller 450 and the driving signal output 410 supplies the code signals CSI to every five driving electrodes among the driving electrodes TE in each group in response to the third driving setting signal with the sum of phases set to n.

As the sum of phases (e.g., net value) is set to n (e.g., 2) in the fourth frame period 4Frame, the code signals CSI are supplied to every five driving electrodes among twelve driving electrodes TE, and the phase of other five touch driving signals may be cancelled during the period SCp in which five code signals CSI are supplied. Since the phases of other five touch driving signals are cancelled during the period SCp or time CTi in which the five code signals CSI are supplied, the sum of phases (for example, two) of the driving electrodes TE that are simultaneously driven may be equal to the sum of phases of n.

The driving mode setter 470 may change the sum of phases of the third driving setting signal and supply it to the touch driving controller 450 so that the sum of phases of the driving electrodes TE in each group can be periodically changed to j, l, m, or n frame by frame.

FIG. 17 is a view showing different touch driving schemes of a touch driver circuit according to a third embodiment.

Referring to FIG. 17, the driving mode setter 470 may supply the first and third driving setting signals to the touch driving controller 450 by combining or alternating them at least every frame so that the number k of the driving electrodes TE in each group, and the sum of phases (e.g., net value) of the driving electrodes TE in each group are changed at least every frame.

The driving mode setter 470 changes the number of codes (or code size) of the first driving setting signal supplied to the touch driving controller 450 which are combined or alternated at least every frame, and the sum of phases (or net value) of the third driving setting signal at least every frame, to supply them to the touch driving controller 450.

The driving mode setter 470, as a seventh driving scheme (alternating driving), may supply the number of codes (or code size) of the first driving setting signal and the sum of phases (or net value) of the third driving setting signal to the touch driving controller 450 by changing them between the odd and even frame periods.

The driving mode setter 470 may set the number of driving electrodes TE in each group to k (e.g., 16) and set the sum of the phases (e.g., net value) to 1 (e.g., 8) in the odd-numbered frame periods (e.g., the first and third frame periods 1Frame and 3Frame). The driving mode setter 470 may set the number of driving electrodes TE in each group to 12 and set the sum of the phases to m (e.g., 4) in the even-numbered frame periods (e.g., the second and fourth frame periods 2Frame and 4Frame).

Figure 18:
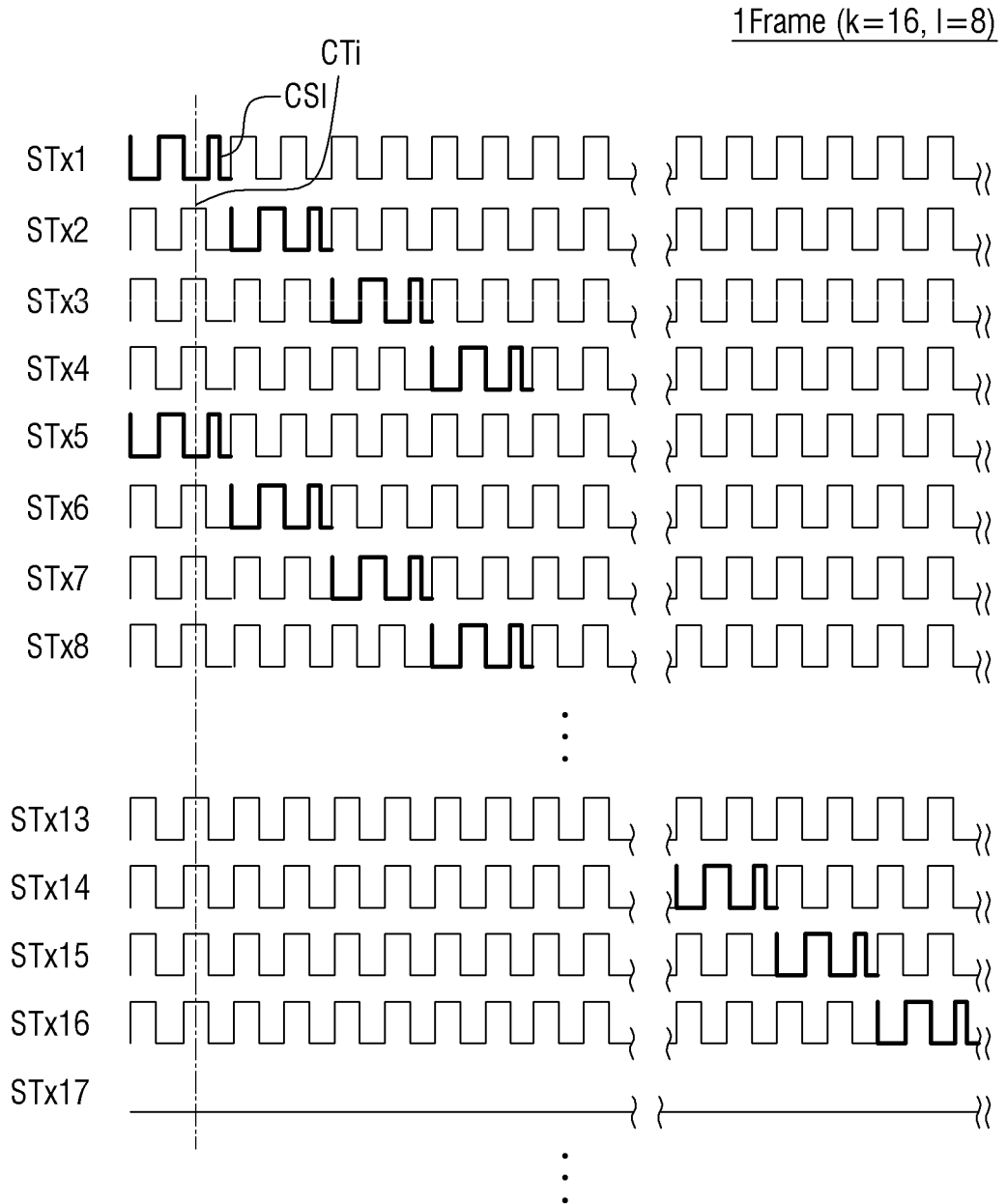
FIG. 18 is a timing diagram illustrating code signals and touch driving signals supplied to the touch driving electrodes in one of the frame periods shown in FIG. 17 according to an embodiment.

FIG. 18 is a timing diagram illustrating code signals and touch driving signals supplied to the touch driving electrodes in one of the frame periods shown in FIG. 17 according to an embodiment.

Referring to FIG. 18, the driving mode setter 470 may set the number of driving electrodes TE in each group to k (e.g., 16) and set the sum of the phases (e.g., net value) to 1 (e.g., 8) in the odd-numbered frame periods (e.g., the first and third frame periods 1Frame and 3Frame). The code signals CSI are simultaneously supplied to four driving electrodes TE among the sixteen driving electrodes TE, and the phases of the four touch driving signals can be cancelled during a period SCp in which four code signals CSI are simultaneously supplied. The phases of the four touch driving signals may be cancelled during the period SCp or the time point CTi in which four code signals CSI are simultaneously supplied. Since the phases of some of the touch driving signals are cancelled by the code signals CSI, the sum of phases (e.g., 8) of the driving electrodes TE that are simultaneously driven may be equal to the sum of phases of 1.

Figure 19:
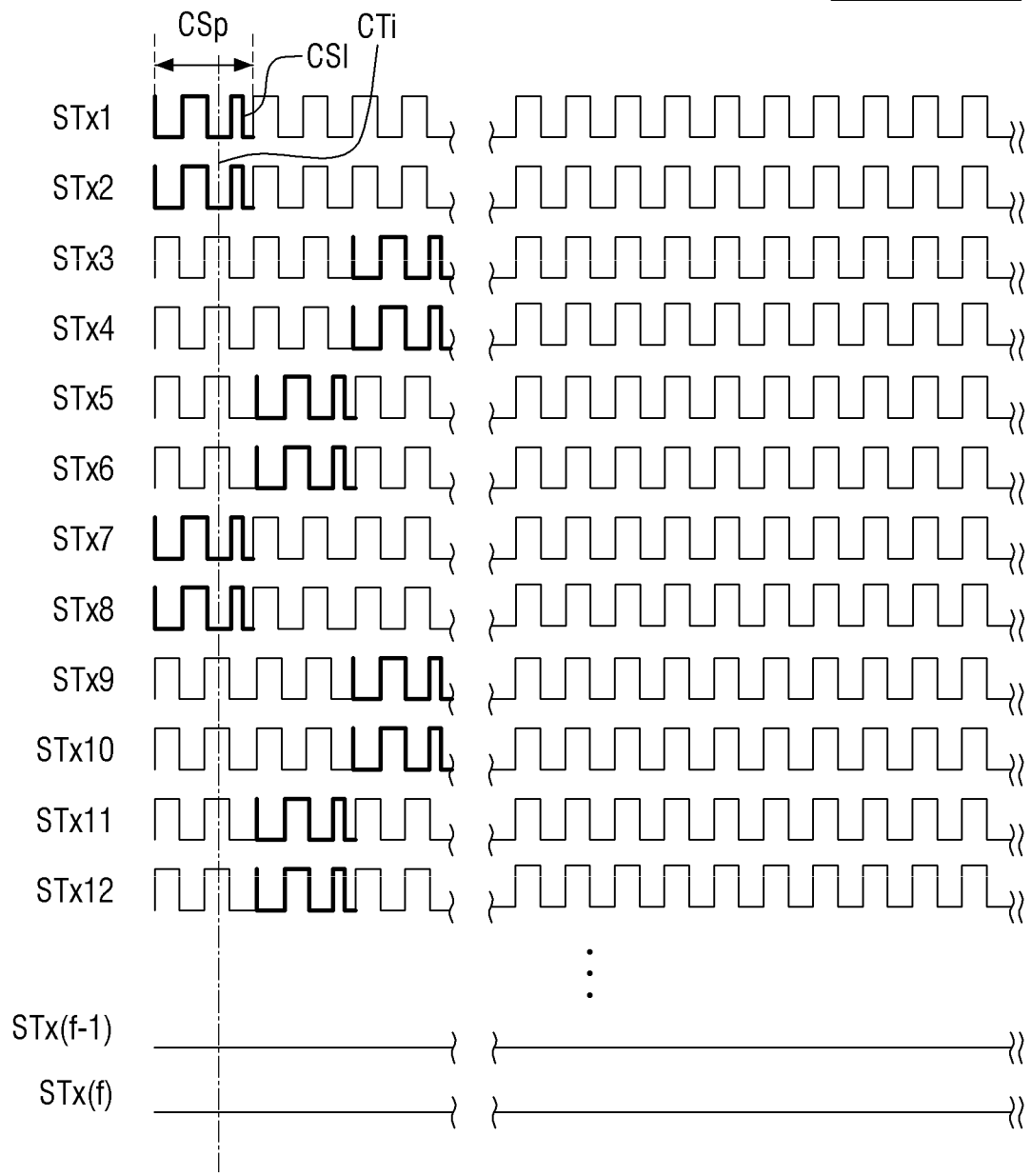
FIG. 19 is a timing diagram illustrating code signals and touch driving signals supplied to touch driving electrodes in one of the frame periods shown in FIG. 17 according to an embodiment.

FIG. 19 is a timing diagram illustrating code signals and touch driving signals supplied to touch driving electrodes in one of the frame periods shown in FIG. 17 according to an embodiment.

Referring to FIG. 19, the driving mode setter 470 may set the number of driving electrodes TE in each group to 12 and set the sum of the phases (e.g., net value) to m (e.g., 4) in the even-numbered frame periods (e.g., the second and fourth frame periods 2Frame and 4Frame).

The code signals CSI are simultaneously supplied to four driving electrodes TE among the twelve driving electrodes TE, and the phases of the four touch driving signals can be cancelled during a period SCp or a time point CTi in which four code signals CSI are simultaneously supplied. Since the phases of four touch driving signals are cancelled during the period SCp or time CTi in which the four code signals CSI are supplied simultaneously, the sum of phases (for example, four) of the driving electrodes TE that are simultaneously driven may be equal to the sum of phases of m.

For the eighth driving scheme (sequential insertion driving) shown in FIG. 17, the driving mode setter 470 may change the number of codes (or code size) of the first driving setting signal and the sum of phases (or net value) of the third driving setting signal each several frames so that the number k of the driving electrodes TE in each group, and the sum of phases (e.g., net value) of the driving electrodes TE in each group are combined and changed each several frames.

Figure 20:
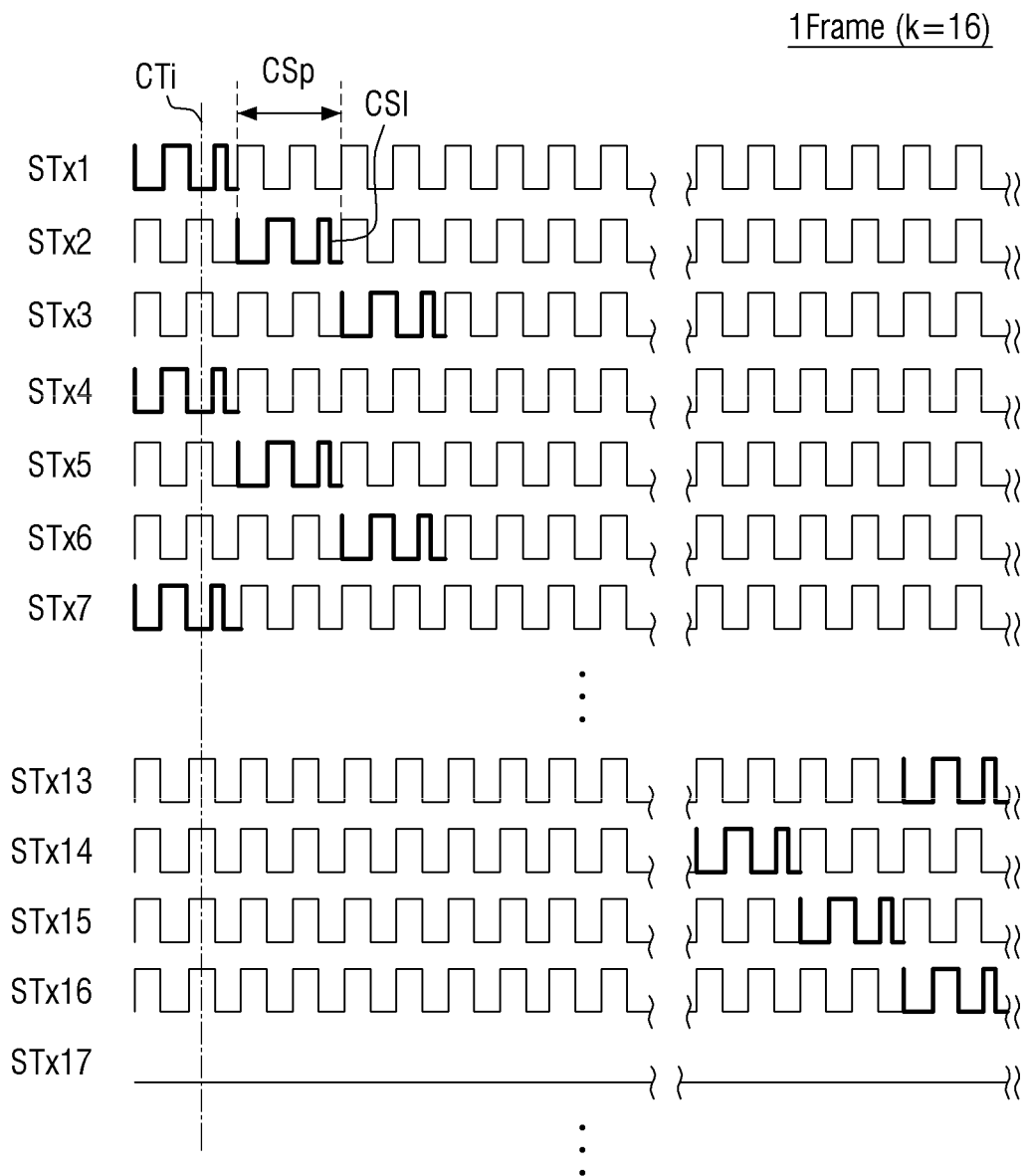
FIG. 20 is a timing diagram illustrating code signals and touch driving signals supplied to touch driving electrodes in one of the frame periods shown in FIG. 17 according to an embodiment.

FIG. 20 is a timing diagram illustrating code signals and touch driving signals supplied to touch driving electrodes in another one of the frame periods shown in FIG. 17 according to an embodiment.

FIG. 20 is a timing diagram showing waveforms of touch driving signals STx1 to STx(f) and code signals CSI supplied to the driving electrodes TE during the first frame period 1Frame, in which the driving electrodes TE in each group are simultaneously driven when the ninth driving scheme (channel number modulation driving) of FIG. 17 is applied.

The driving mode setter 470 sets the number of driving electrodes TE in each group to k (e.g., 16) in the first frame period 1Frame. The driving mode setter 470 supplies to the touch driving controller 450 a third driving setting signal with the sum of phases set to j so that the code signals CSI are sequentially supplied to the driving electrodes TE in each group.

Referring to FIG. 20, the driving signal output 410 sequentially drives the groups each having sixteen driving electrodes TE during the first frame period 1Frame in response to the touch driving control signal of the touch driving controller 450. The touch driving signals STx1 to STx16 are simultaneously supplied to the sixteen driving electrodes TE included in each of the groups, which are sequentially driven.

The driving signal output 410 supplies code signals CSI to every sixteen driving electrodes TE while the touch driving signals STx1 to STx16 are supplied to sixteen driving electrodes TE in each group. At this time, the touch driving controller 450 and the driving signal output 410 sequentially supplies the code signals CSI to the driving electrodes TE in each group in response to the third driving setting signal with the sum of phases set to j.

As the sum of phases (e.g., net value) is set to j (e.g., 10) in the first frame period 1Frame, the code signals CSI are simultaneously supplied to every three driving electrodes among sixteen driving electrodes TE, and the phase of other three touch driving signals may be cancelled during the period SCp in which three code signals CSI are supplied. Since the phases of other three touch driving signals are cancelled during the period SCp or time CTi in which the three code signals CSI are supplied, the sum of phases (for example, ten) of the driving electrodes TE that are simultaneously driven may be equal to the sum of phases of j.

Subsequently, the driving mode setter 470 sets the sum of phases of driving electrodes TE in each group to k (e.g., 16) in the second frame period 2Frame. Subsequently, the driving mode setter 470 changes the sum of phases of driving electrodes TE in each group to 1 (e.g., 8) in the second frame period 2Frame. Subsequently, the third driving setting signal with the sum of phases set to 1 may be supplied to the touch driving controller 450.

Referring back to FIG. 18, the driving signal output 410 sequentially drives the groups each having 16 driving electrodes TE in response to the touch driving control signal of the touch driving controller 450. The touch driving signals STx1 to STx16 are simultaneously supplied to the sixteen driving electrodes TE included in each of the groups, which are sequentially driven.

The driving signal output 410 supplies code signals CSI to every sixteen driving electrodes TE while the touch driving signals STx1 to STx16 are supplied to four driving electrodes TE in each group. At this time, the touch driving controller 450 and the driving signal output 410 simultaneously supplies the code signals CSI to every four driving electrodes among the driving electrodes TE in each group in response to the third driving setting signal with the sum of phases set to 1.

The code signals CSI are simultaneously supplied to four driving electrodes TE among the sixteen driving electrodes TE, and the phases of the four touch driving signals can be cancelled during a period SCp in which the four code signals CSI are simultaneously supplied. The phases of the four touch driving signals may be cancelled during the period SCp or the time point CTi in which the four code signals CSI are simultaneously supplied. Since the phases of some of the touch driving signals are cancelled by the code signals CSI, the sum of phases (e.g., 8) of the driving electrodes TE that are simultaneously driven may be equal to the sum of phases of 1.

Subsequently, the driving mode setter 470 sets the sum of phases of driving electrodes TE in each group to 12 in the third frame period 3Frame. Subsequently, the driving mode setter 470 changes the sum of phases of driving electrodes TE in each group to m (e.g., 4) in the third frame period 3Frame. Subsequently, the third driving setting signal with the sum of phases set to m may be supplied to the touch driving controller 450.

Figure 21:
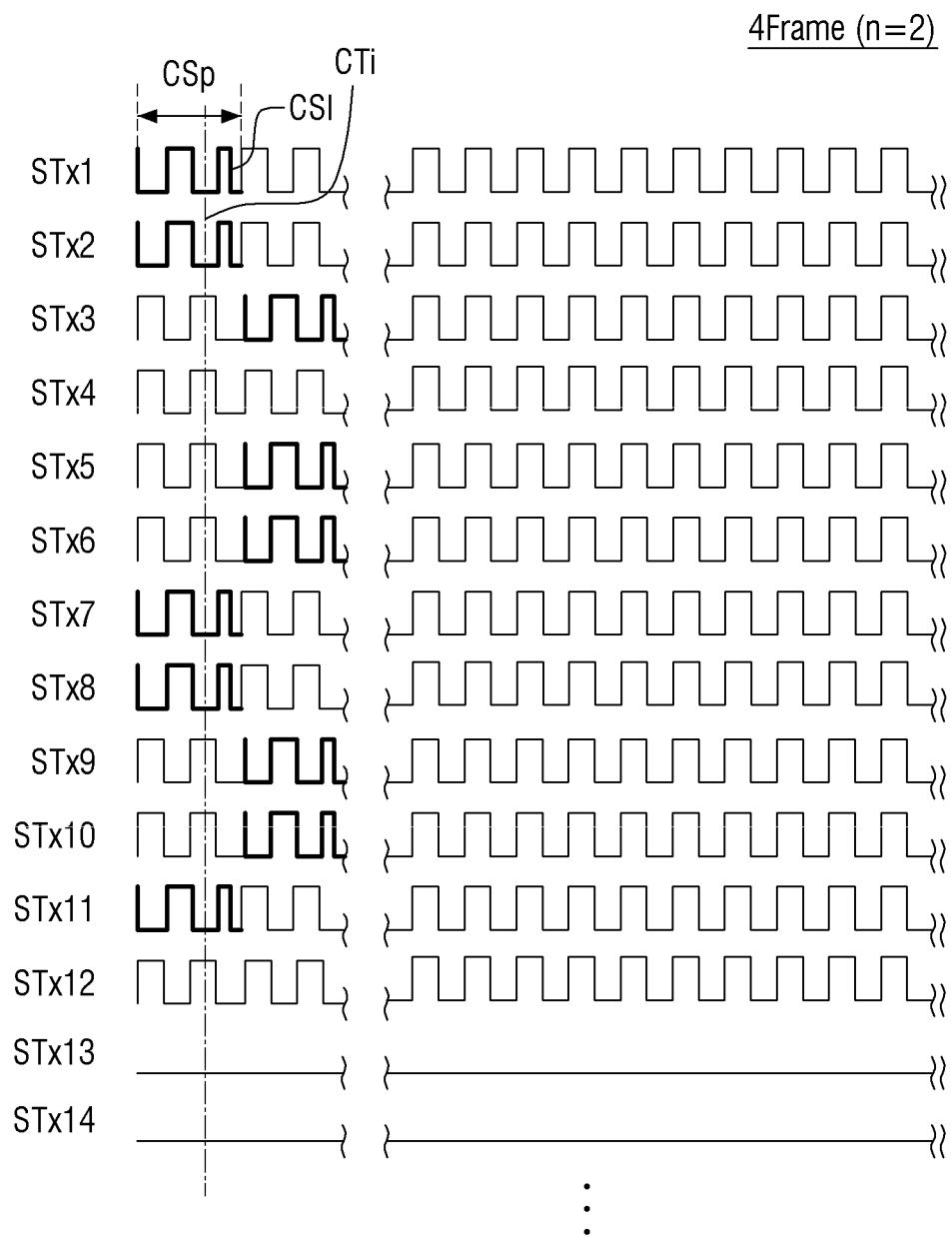
FIG. 21 is a timing diagram illustrating code signals and touch driving signals supplied to touch driving electrodes in one of the frame periods shown in FIG. 17 according to an embodiment.

FIG. 21 is a timing diagram illustrating code signals and touch driving signals supplied to touch driving electrodes in one of the frame periods shown in FIG. 17 according to an embodiment.

The driving mode setter 470 fixes the number of driving electrodes TE in each group to 12 and changes the sum of phases to n, (e.g., 2) in the fourth frame period 4Frame.

The driving signal output 410 sequentially drives the groups each having 12 driving electrodes TE in response to the touch driving control signal of the touch driving controller 450. The touch driving signals STx1 to STx12 are simultaneously supplied to the twelve driving electrodes TE included in each of the groups, which are sequentially driven.

The driving signal output 410 supplies code signals CSI to every five driving electrodes TE while the touch driving signals STx1 to STx12 are supplied to twelve driving electrodes TE in each group. At this time, the touch driving controller 450 and the driving signal output 410 simultaneously supplies the code signals CSI to every five driving electrodes among the driving electrodes TE in each group in response to the third driving setting signal with the sum of phases set to n.

As the sum of phases (e.g., net value) is set to n (e.g., 2) in the fourth frame period 4Frame, the code signals CSI are supplied to every five driving electrodes among twelve driving electrodes TE, and the phase of other five touch driving signals may be cancelled during the period SCp in which five code signals CSI are supplied. Since the phases of other five touch driving signals are cancelled during the period SCp or time CTi in which the five code signals CSI are supplied, the sum of phases (for example, two) of the driving electrodes TE that are simultaneously driven may be equal to the sum of phases of n.

The driving mode setter 470 according to embodiments changes the number of codes (or code size) of the first driving setting signal (which are combined or alternated at least every frame) supplied to the touch driving controller 450, and the sum of phases (or net value) of the third driving setting signal at least every frame, thereby adjusting the amount of EMI radiation at least every frame.

Figure 22:
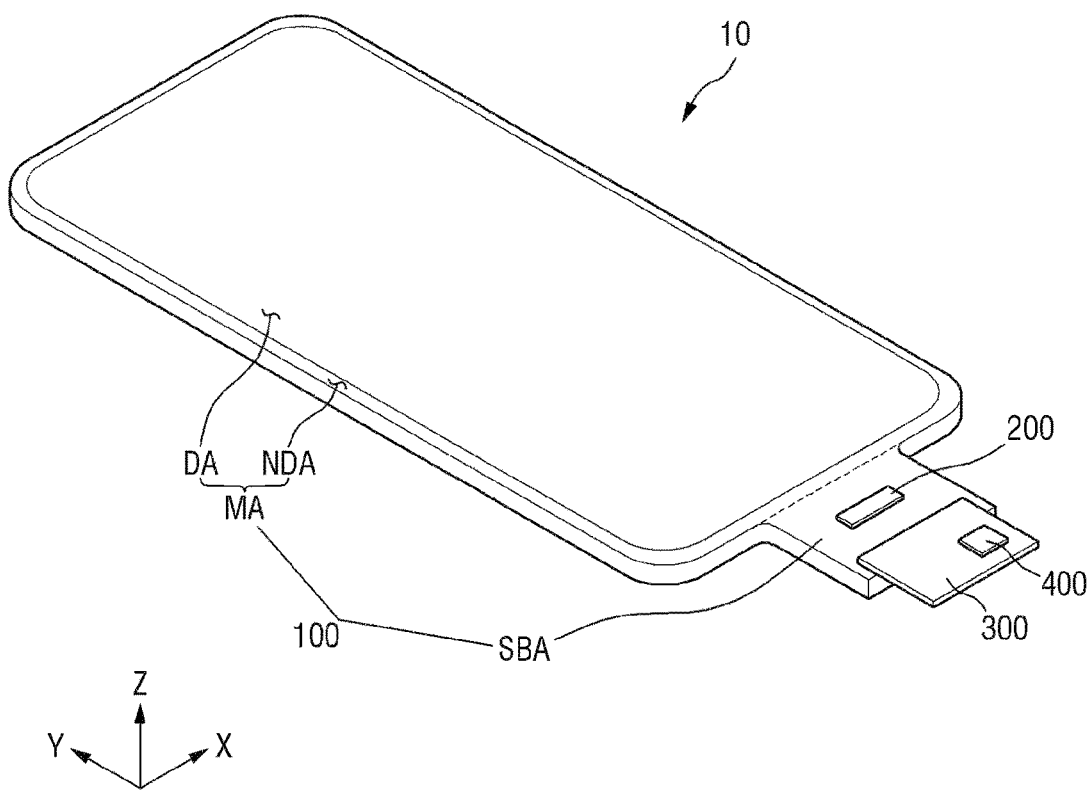
FIG. 22 is a perspective view showing a display device according to an embodiment.

FIG. 22 is a perspective view showing a display device 10 according to an embodiment.

Referring to FIG. 22, a display device 10 according may be included in a mobile phone, a smart phone, or a tablet PC. Referring to FIGS. 1 and 2, the display device 10 includes a display panel 100, a display driver circuit 200, and a touch detection module including a touch sensing unit TSU and a touch driver circuit 400. The touch driver circuit 400 can adjust the amount of EMI radiation by combining or alternating the group-wise driving scheme and the sequential driving scheme of the touch electrodes at least every frame. The touch driver circuit 400 can adjust the amount of EMI radiation and the accuracy of touch detection by changing or adjusting the number of touch electrodes in each group (e.g., the number of touch driving channels) at least every frame when the group-wise driving scheme is applied for the touch electrodes. The touch driver circuit 400 can adjust the amount of EMI radiation by controlling code signals supplied sequentially or simultaneously to at least one touch electrode in a period in which the touch driving signals are supplied simultaneously to each group when the group-wise driving scheme for the touch electrodes is applied.

Figure 23:
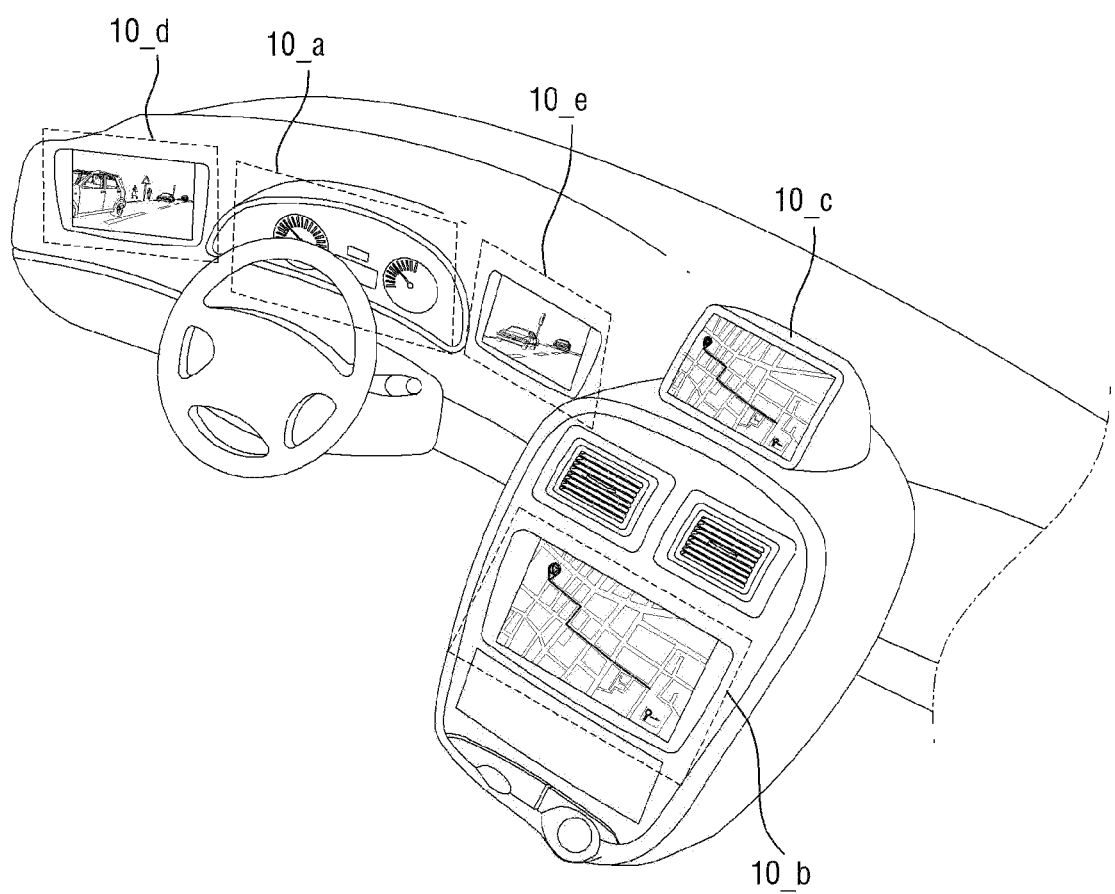
FIG. 23 is a view showing an instrument cluster and a center fascia for a vehicle which include display devices according to an embodiment.

FIG. 23 is a view showing an instrument cluster and a center fascia for a vehicle which include display devices according to an embodiment.

FIG. 23 shows a vehicle including display devices 10_a, 10_b, 10_c, 10_d and 10_e. The display devices 10_a may be included in the dashboard of the vehicle. The display devices 10_b may be included in the center fascia of the vehicle. The display devices 10_c may be a center information display (CID) disposed on the dashboard of a vehicle. The display devices 10_d and 10_e may be room mirror displays, which can replace rear-view mirrors of the vehicle.

Figure 24:
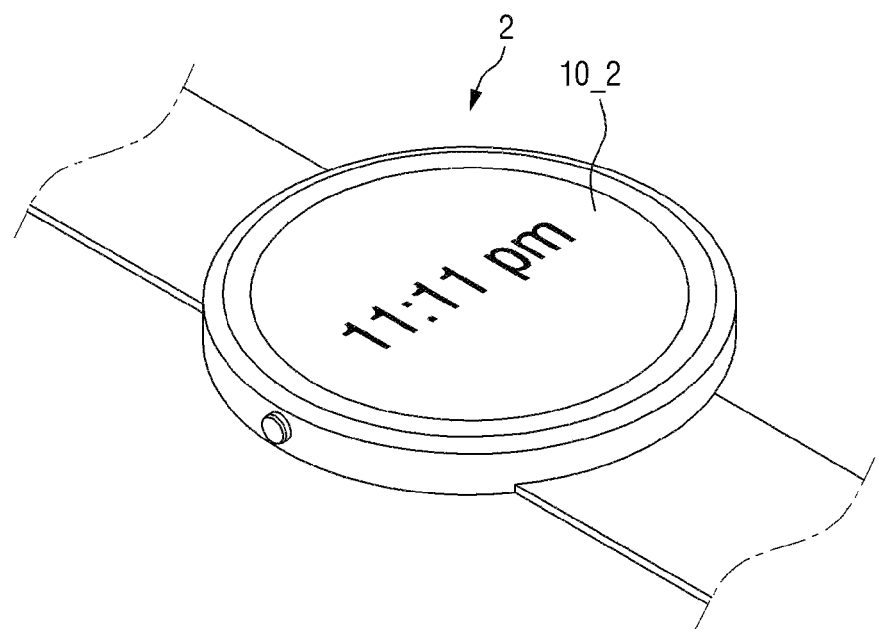
FIG. 24 is a view showing a smart device including a display device according to an embodiment.

FIG. 24 is a view showing a smart device including a display device according to an embodiment.

Referring to FIG. 24, at least one display device 10_2 may be applied to a smart watch 2, a smart device.

Figure 25:
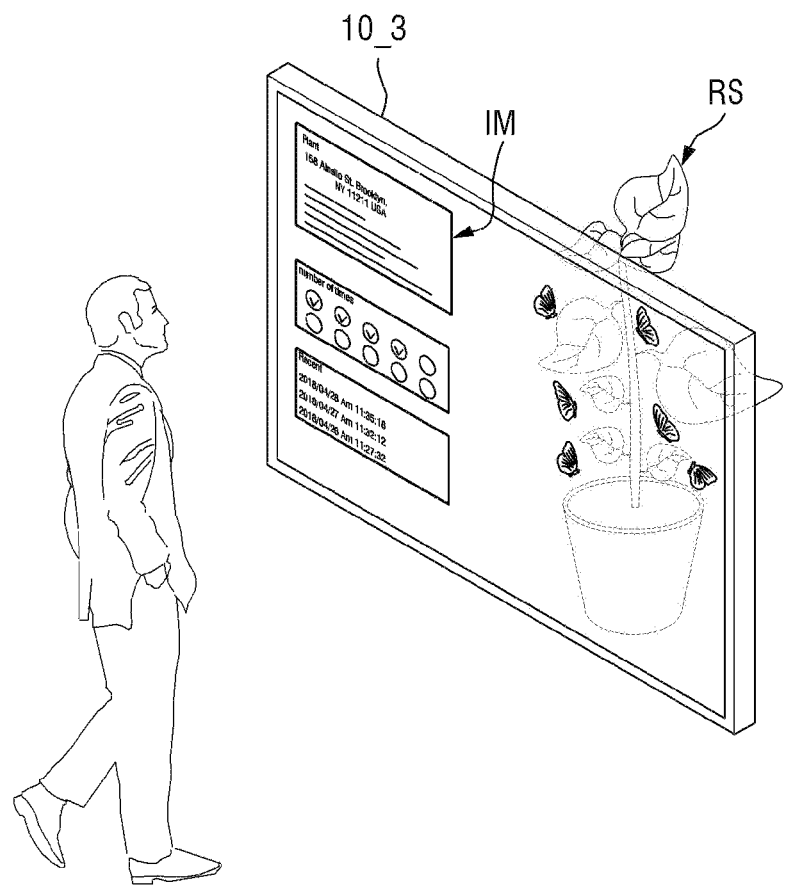
FIG. 25 is a view showing a transparent display device according to an embodiment.

FIG. 25 is a view showing a transparent display device according to an embodiment.

Referring to FIG. 25, the transparent display device 10_3 may transmit light while displaying images IM. Therefore, a user located in front of the transparent display device 10_3 can see not only the images IM displayed on the display device but also an object RS or the background located behind the transparent display device 10_3. In the display device 10_3, the display panel 100 of the display device shown in FIGS. 1 and 2 may include a light-transmitting portion that can transmit light and/or may be made of a material that can transmit light.

Variations and modifications can be made to the described embodiments without substantially departing from the scope specified by the claims. The described embodiments are illustrative and not for purposes of limitation.

What is claimed is:

1. A touch detection module comprising:
   driving electrodes extending parallel to each other;
   sensing electrodes crossing the driving electrodes; and
   a touch driver circuit configured to supply touch driving signals to the driving electrodes and to detect touch sensing signals through the sensing electrodes to determine touch position coordinates,
   wherein the touch driver circuit selects between a group driving scheme and a sequential driving scheme for at least one frame among consecutive frames,
   wherein the touch driver circuit sorts the driving electrodes into groups, simultaneously drives at least two driving electrodes in a same group among the groups, and drives the groups at different times according to the group driving scheme, the at least two driving electrodes in the same group have a same length as one side of a touch sensing area of the touch detection module, and
   wherein the touch driver circuit sequentially drives the driving electrodes according to the sequential driving scheme.

2. The touch detection module of claims 1,
   wherein the touch driver circuit selects the group driving scheme for some frames among four consecutive frames and selects the sequential driving scheme for one or more other frames among the four consecutive frames.

3. The touch detection module of claims 1,
   wherein the touch driver circuit selects the group driving scheme and sets a first number of driving electrodes in each group for a first frame, wherein the touch driver circuit selects the group driving scheme and sets a second number of driving electrodes in each group for a second frame, and wherein the first number is unequal to the second number.

4. A touch detection module comprising:
   driving electrodes extending parallel to each other;
   sensing electrodes crossing the driving electrodes; and
   a touch driver circuit configured to supply touch driving signals to the driving electrodes and to detect touch sensing signals through the sensing electrodes to determine touch position coordinates,
   wherein the touch driver circuit selects between a group driving scheme and a sequential driving scheme for at least one frame among consecutive frames,
   wherein the touch driver circuit sorts the driving electrodes into groups, simultaneously drives driving electrodes in a same group among the groups, and drives the groups at different times according to the group driving scheme,
   wherein the touch driver circuit sequentially drives the driving electrodes according to the sequential driving scheme,
   wherein the touch driver circuit supplies code signals to at least one driving electrode in a first group sequentially or simultaneously when the touch driver circuit supplies first touch driving signals simultaneously to driving electrodes in the first group, and
   wherein the touch driver circuit detects the code signals through the sensing electrodes.

5. The touch detection module of claim 1, wherein the touch driver circuit comprises:
   a driving signal output for supplying the touch driving signals to the driving electrodes;
   a sensing circuit for detecting the touch sensing signals through the sensing electrodes;
   a touch driving controller for controlling the driving signal output so that the touch driving signals are supplied to the driving electrodes; and
   a driving mode setter for selecting one of the group driving scheme and the sequential driving scheme as a selected driving scheme and for supplying one or more driving setting signals corresponding to the selected driving scheme to the touch driving controller.

6. The touch detection module of claim 5,
   wherein the driving mode setter sets a number of driving electrodes to be simultaneously driven in each group to generate a first driving setting signal, and supplies the first driving setting signal to the touch driving controller so that the driving signal output supplies first touch driving signals simultaneously to driving electrodes in a first group for a first frame.

7. The touch detection module of claim 6,
   wherein the driving mode setter supplies a second driving setting signal to the touch driving controller so that the driving signal output supplies second touch driving signals sequentially to the driving electrodes for a second frame different from the first frame.

8. The touch detection module of claim 6,
   wherein the driving mode setter, in the group driving scheme, sets two different numbers of driving electrodes in each group for two consecutive frames, respectively, and sets two different numbers of codes according to the two different numbers of the driving electrodes in each group.

9. The touch detection module of claim 8,
   wherein the driving mode setter generates a third driving setting signal and supplies the third driving setting signal to the touch driving controller so that the driving signal output supplies predetermined code signals sequentially or simultaneously to at least one driving electrode among the driving electrodes in the first group.

10. The touch detection module of claim 9,
    wherein the driving mode setter sets two different numbers and two different orders of code signals for two third driving setting signals for two different frames, respectively.

11. The touch detection module of claim 10,
    wherein the driving mode setter supplies the third driving setting signal the touch driving controller for at least one of the first frame, the second frame, and a third frame different from each of the first frame and the second frame.

12. The touch detection module of claim 10,
    wherein the driving mode setter sets two different sums of phases for the two third driving setting signals or two other third driving setting signals for the two different frames or two other different frames.

13. The touch detection module of claim 10,
    wherein the driving mode setter sets two different numbers of codes for two first driving setting signals and sets two different sums of phases for the two third driving setting signals or two other third driving setting signals for the two different frames or two other different frames.

14. A display device comprising:
    a display panel comprising a display area including sub-pixels; and
    a touch detection module overlapping the display panel,
    wherein the touch detection module comprises:
       driving electrodes extending parallel to each other;
       sensing electrodes crossing the driving electrodes; and a touch driver circuit configured to supply touch driving signals to the driving electrodes and to detect touch sensing signals through the sensing electrodes to determine touch position coordinates, wherein the touch driver circuit selects between a group driving scheme and a sequential driving scheme for at least one frame among consecutive frames, wherein the touch driver circuit sorts the driving electrodes into groups, simultaneously drives at least two driving electrodes in a same group among the groups, and drives the groups at different times according to the group driving scheme, the at least two driving electrodes in the same group have a same length as one side of a touch sensing area of the touch detection module, and wherein the touch driver circuit sequentially drives the driving electrodes according to the sequential driving scheme.

15. The display device of claim 14, wherein the touch driver circuit comprises:
a driving signal output for supplying the touch driving signals to the driving electrodes;
a sensing circuit for detecting the touch sensing signals through the sensing electrodes;
a touch driving controller for controlling driving of the driving signal output so that the touch driving signals are supplied to the driving electrodes; and
a driving mode setter for selecting between the group driving scheme and the sequential driving scheme as a selected driving scheme and for supplying one or more driving setting signals corresponding to the selected driving scheme to the touch driving controller.

16. The display device of claim 15,
wherein the driving mode setter sets a number of driving electrodes to be simultaneously driven in each group to generate a first driving signal, and supplies the first driving setting signal to the touch driving controller so that the driving signal output supplies first touch driving signals simultaneously to the driving electrodes in a first group for a first frame.

17. The display device of claim 16,
wherein the driving mode setter, in the group driving scheme, sets two different numbers of driving electrodes in each group for two consecutive frame, respectively, and sets two numbers of codes according to the two different numbers of the driving electrodes in each group for the two consecutive frames, respectively.

18. The display device of claim 17,
wherein the driving mode setter generates a third driving setting signal and supplies the third driving setting signal to the touch driving controller so that the driving signal output supplies predetermined code signals sequentially or simultaneously to at least one driving electrode among the driving electrodes in the first group.

19. The display device of claim 18,
wherein the driving mode setter sets two different numbers and two different orders of code signals for two third driving setting signals for two different frames, respectively.

20. The display device of claim 18,
wherein the driving mode setter supplies the third driving setting signal the touch driving controller for at least one of the first frame, a second frame different from the first frame, and a third frame different from each of the first frame and the second frame.

* * * * *